(12) United States Patent
Osawa et al.

(10) Patent No.: US 6,379,518 B1
(45) Date of Patent: Apr. 30, 2002

(54) ELECTRODEIONIZATION APPARATUS AND PURE WATER PRODUCING APPARATUS

(75) Inventors: Masanobu Osawa; Osamu Kato, both of Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 0 days.

(21) Appl. No.: 09/633,839

(22) Filed: Aug. 7, 2000

(30) Foreign Application Priority Data

Aug. 11, 1999 (JP) .......................................... 11-227713

(51) Int. Cl.[7] .......................... C02F 1/469; B01D 61/48
(52) U.S. Cl. ...................... 204/524; 204/634; 204/635; 204/638
(58) Field of Search ................................ 204/632, 633, 204/634, 635, 636, 638, 524, 533, 628

(56) References Cited

U.S. PATENT DOCUMENTS 4,931,160 A * 6/1990 Giuffrida .................... 204/301
5,116,509 A * 5/1992 White ......................... 210/664
6,056,878 A * 5/2000 Tessier et al. ............... 210/639

OTHER PUBLICATIONS

Chemical Engineers' Handbook, Perry & Chilton, 5th ed., McGraw–Hill Book Company, Chap 22, pp. 51–52.*

* cited by examiner

Primary Examiner—Arun S. Phasge
Assistant Examiner—Thomas H. Parsons
(74) Attorney, Agent, or Firm—Kanesaka & Takeuchi

(57) ABSTRACT

The electrodeionization apparatus 3A has a plurality of cation exchange membrane and plurality of anion exchange membrane alternately arranged between electrodes in such a manner as to alternately form diluting compartments and concentrating compartments. The diluting compartments are filled with an ion exchanger. The product water having pH exceeding pH of the feed water by 1.0 or more when the feed water having pH of equal to or less than 8.5 is treated without adding alkaline agents. The apparatus for producing purified water has plural electrodeionization apparatuses 3A, 3B connected each other so that the feed water flows through the electrodeionization apparatuses.

19 Claims, 12 Drawing Sheets

Fig. 3
Prior Art
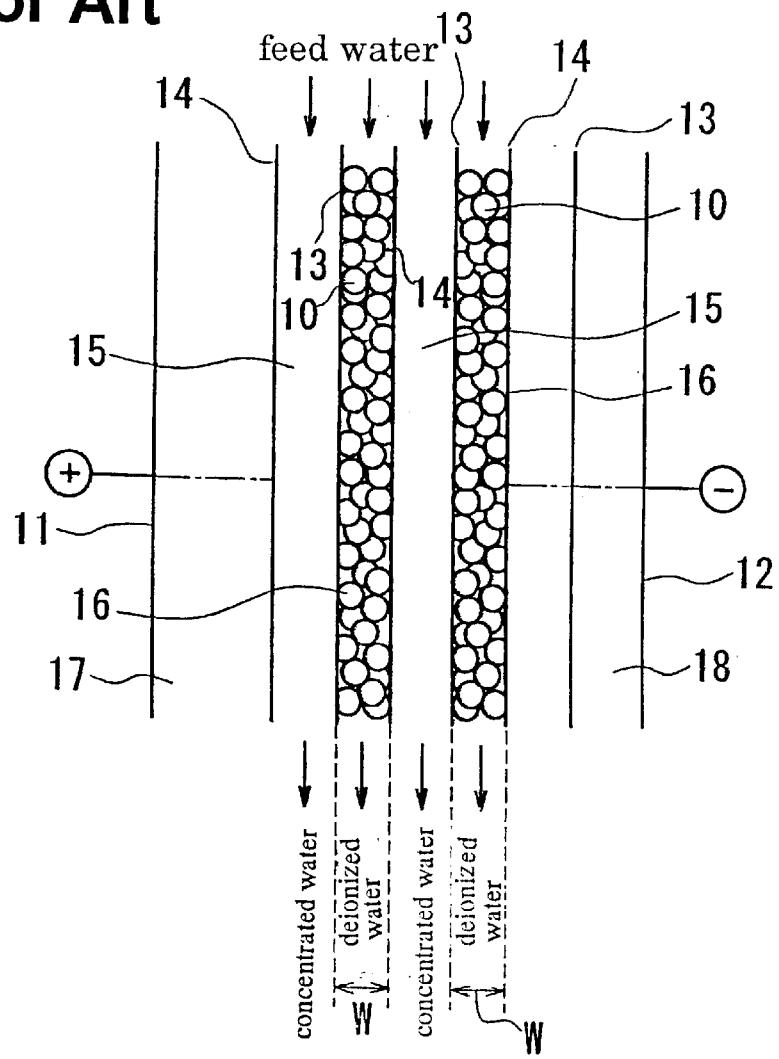
Fig. 4 Prior Art
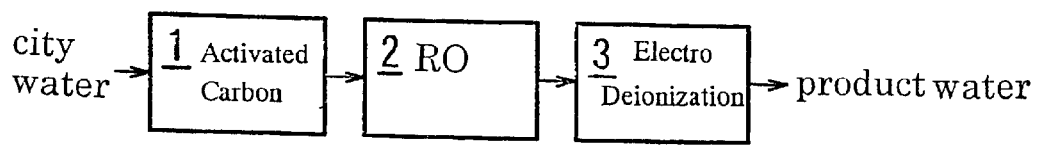

ELECTRODEIONIZATION APPARATUS AND PURE WATER PRODUCING APPARATUS

BACKGROUND OF THE INVENTION

1. Field of the invention

The present invention relates to an electrodeionization apparatus used for producing deionized water in various fields including semiconductor manufacturing, liquid crystal display manufacturing, pharmaceutical manufacturing, food processing, electric power generation, private device, research establishments and the like, particularly to an electrodeionization apparatus. More particularly, the present invention relates to the electrodeionization apparatus which removes weakly-ionized species electrolytes including silica and boron at a high rate, and is suitable to be employed by a primary pure water system and a reclaim system of pure water producing apparatus.

Furthermore, the present invention relates to an apparatus for producing purified water which employs the electrodeionization apparatus of the present invention so that the apparatus provides the product water of high quality having a resistivity of more than 18.0M$\Omega$·cm.

2. Description of the Related Art

The electrodeionization apparatus used for producing the deionized water is employed in various fields including the semiconductor manufacturing plants, the liquid crystal display manufacturing plants, the pharmaceutical manufacturing industry, the food processing industry, the electric power industry, the private devices, the research establishments and the like.

FIG. 3 shows an electrodeionization apparatus disclosed in JPH4-72567B, JP2751090, and JP2699256 in which a plurality of anion exchange membranes 13 and a plurality of cation exchange membranes 14 are alternately arranged between electrodes (anode 11, cathode 12) in such a manner as to alternately form concentrating compartments 15 and diluting compartments 16, and the diluting compartments 16 are filled with anion exchangers 10 and cation exchangers 10 comprising ion exchange resins, ion exchange fibers or graft exchangers in mixed or multi-layered form. In FIG. 3, the sign 17 denotes an anodic compartment and the sign 18 denotes a cathodic compartment.

In the electrodeionization apparatus, $H^+$ ions and $OH^-$ ions are formed by dissociation of the water to continuously regenerate the ion exchangers filled in the diluting compartments so that the electrodeionization apparatus can efficiently deionize the water.

FIG. 12 is an exploded view showing the structure of the electrodeionization apparatus.

The electrodeionization apparatus includes a cathode end plate 101, a cathode 102 extending along the end plate 101, a cathode spacer 103 extending along the outer periphery of the cathode 102 which are superposed in this order. Further, a cation-exchange membrane 104, a frame 105 for defining a diluting compartment., an anion-exchange membrane 106, and a frame 107 for defining a concentrating compartment are superposed on the cathode spacer 103 in this order. The cation-exchange membrane 104, the frame 105 for defining a diluting compartment, the anion-exchange membrane 106, the frame 107 for defining a concentrating compartment compose one unit. The apparatus is composed of a plurality of such units superposed together. That is, membranes 104, frames 105, membranes 106, and frames 107 are repeatedly superposed one unit over the other unit. An anode 109 is superposed between the last anion-exchange membrane 106 and an anode spacer 108. An anode end plate 110 is superposed on the anodic electrode 109. The apparatus is tightened by bolts or the like.

The space defined by the inner surface of the frame 105 is the diluting compartment in which an ion exchanger 105R such as ion-exchange resin is filled. The space defined by the inner surface of the frame 107 is the concentrating compartment in which a spacer including a mesh spacer is disposed.

A direct electric current is supplied to pass between the anode 109 and the cathode 102, raw water to be treated is fed to the diluting compartment through a raw water inlet line 111, and feed water is fed to the concentrating compartment through a concentrate inlet line 112. The raw water fed to the diluting compartment flows through a layer filled with the ion-exchange resin whereby impurity ion in the raw water is removed so as to make the raw water to b deionized water which flows out through a deionized water outlet line 118.

The impurity ions permeate the membranes 104, 106, the concentrated water in the concentrating compartment flows out through a concentrate outlet line 114. Electrode water is passed within electrode compartments through introducing lines 115, 116 and discharging lines 117, 118, respectively.

An electrodeionization apparatus in which a diluting compartment is provided with vertical partition ribs for dividing the diluting compartment into cells being long in the vertical direction is disclosed in JP4-72567B. According to this electrodeionization apparatus having the diluting compartment divided into long cells by ribs in which ion-exchange resins are filled respectively, the channelizing phenomenon where the flow of water from the inlet to the outlet of the diluting compartment is partially one-sided is prevented and the compression and the ion-exchange resins in the diluting compartment are prevented from being compressed or moved.

In the electrodeionization apparatus of JP4-72567B, the number of the cells is limited because the cells are formed by dividing the diluting compartment in the vertical direction. That is, a large number of cells can not be formed in the apparatus. Further, the flow of the water in a lateral direction is blocked by the ribs, so that the contact efficiency between the water and the ion-exchange resins is poor. In addition, the ion-exchange resins are compressed at lower portions of the cells so that the cells have a vacancy at upper portions thereof, whereby the rate of filling the ion-exchange resins tends to be poor.

FIG. 4 is a system diagram showing a conventional apparatus for producing purified water provided with the electrodeionization apparatus in which raw water such as the city water is treated in an activated carbon treating device 1, a reverse osmosis membrane treating device 2, and an electrodeionization apparatus 3.

To remove weakly-ionized species electrolytes including carbon dioxide gas ($CO_2$), silica, boron and the like in an electrodeionization apparatus, it is required to ionize these species and form ions as follows in diluting compartments:

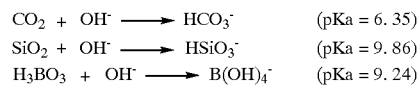

$$CO_2 + OH^- \longrightarrow HCO_3^- \quad (pKa = 6.35)$$
$$SiO_2 + OH^- \longrightarrow HSiO_3^- \quad (pKa = 9.86)$$
$$H_3BO_3 + OH^- \longrightarrow B(OH)_4^- \quad (pKa = 9.24)$$

Even the conventional electrodeionization apparatus can completely remove weakly-ionized species having low dissociation constant (pKa) such as $CO_2$ by increasing the applied voltage to dissociate water. However, the conventional electrodeionization apparatus scarcely removes weakly-ionized species having high dissociation constants such as silica and boron on the order of 60 to 90% even when the applied voltage is increased.

In order to solve above problems, the following have been proposed.

I. To fill diluting compartments with multi-layered ion exchangers composed of an anion exchange layer and a cation exchange layer so as to make the water alkaline temporarily in the anion exchange layer (as disclosed in JP-H471624A).

II. To adjust pH of feed water in a range of 9.5 to 11.5 to be fed into the electrodeionization apparatus (as disclosed is U.S. Pat. No. 4,298,442).

III. To provide the conventional electrodeionization apparatuses at two or more stages. To provide RO apparatuses at two or more stages to remove silica before the electrodeionization apparatus.

In the above case I, the diluting compartments filled with multi-layered ion exchangers cannot lower the concentration of silica to less than 0.1 ppb as required in the fields of the semiconductor manufacturing and the like.

In the above case II, although the removal rate of silica is increased by 5 to 10%, it requires a device for adding agents including caustic soda to control pH and to provide a softening device to completely remove the hardness including $Ca^{2+}$ and $Mg^{2+}$ from the feed water, whereby increasing equipment costs.

In the aforementioned case III, an electrodeionization apparatus of non-regenerative mixed bed type is necessary after the electrodeionization apparatus because the water treated by the electrodeionization apparatus includes silica and boron of 0.5 to 1.0 ppb or more.

Generally, when the electrodeionization apparatus is applied with the electrical current exceeding the critical current density to deionize, $OH^-$ and $H^+$ are formed by water dissociation as described above to carry the electric charge. $H^+$ ion has mobility of 349.7 $cm^2\Omega^{-1}eq^{-1}$, which is very large in comparison with that of the other ions (30 to 70 $cm^2\Omega^{-1}eq^{-1}$, ref; Manual of Chemistry published by Japanese Chemical Society). Therefore, particularly when the diluting compartment has a large thickness W, the difference of the mobilities between $H^+$ and $OH^-$ is increased so that $H^+$ tends to be quickly discharged to the concentrating compartments and $OH^-$ tends to remain in the diluting compartment. Furthermore, $Na^+$ and $K^+$ also tend to remain in the diluting compartments because these are monovalent and $H^+$ ion carries the electrons, while the multi-valent cations and anions including $Ca^{2+}$, $Mg^{2+}$ are discharged to the concentrating compartments with relative ease. As the result, the product water tends to include monovalent alkali such as NaOH and KOH so that the product water (deionized water) becomes alkaline.

Conversely, the concentrated water becomes acidic by the same reason.

SUMMARY OF THE INVENTION

It is an object of the present invention to provide an electrodeionization apparatus which overcomes the aforementioned problems so that the electrodeionization apparatus is free of scale and is exceedingly improved in the removal rate of the weakly-ionized species including silica, boron and the like without adding agents such as the caustic soda. Further, it is also an object to provide an apparatus for producing purified water employing the electrodeionization apparatus.

The electrodeionization apparatus of the present invention has an anode, a cathode, concentrating compartments, and diluting compartments which are formed by arranging a plurality of anion exchange membranes and cation exchange membranes between the anode and the cathode, ion exchangers filled in the diluting compartments. The electrodeionization apparatus can produce the product water having a pH higher than a pH of the feed water by 1.0 or more when the feed water having pH of equal to or less than 8.5 is treated without adding alkaline agent.

The electrodeionization apparatus of the present invention efficiently removes the weakly-ionized species including silica, boron from the feed water.

The apparatus for producing purified water of the present invention is provided with plural stages of the electrodeionization apparatuses through which the feed water flows in order. The foremost electrodeionization apparatus is the electrodeionization apparatus of present invention.

The foremost electrodeionization apparatus removes a part of carbon dioxide gas, silica, boron and the hardness from the feed water. The water treated in the foremost electrodeionization apparatus has the same conductivity as the feed water and higher pH than the feed water.

The water treated by the foremost apparatus is then treated by conventional electrodeionization apparatus to remove the residual silica, boron and the other ions.

When the diluting compartment has a thickness exceeding the range of 1.26 to 6.35 mm as disclosed in JP H4-72567B and is filled with either the anion exchanger alone or the anion exchanger mixed with the cation exchanger, the electrodeionization apparatus behaves specifically. That is, when the water including a small amount of alkaline metal ion or alkaline earth metal ion which are taken out of a reverse osmosis apparatus (RO apparatus) flows through the electrodeionization apparatus, the carbon dioxide gas ($CO_2$) and the anion in the water are removed, besides about 90% of silica and boron are removed.

While the hardness including $Ca^{2+}$ and $Mg^{2+}$ is also removed, the monovalent cations including $Na^+$ and $K^+$ have difficulty in being removed and the alkalis such as NaOH and KOH which have high molar conductivity leak into the treated water so that the treated water tends to be increased in pH and slightly in conductivity.

The cause of the aforementioned behavior of the electrodeionization apparatus has not been clear in detail, but supposed as follows. That is, when the electrodeionization apparatus is applied with the electrical current in excess of critical current density to deionize, $OH^-$ and $H^+$ are formed by water dissociation as described above to carry the electric charge. $H^+$ ion has mobility of 349.7 $cm^2\Omega^{-1}eq^{-1}$, which is very large in comparison with that of the other ions (30 to 70 $cm^2\Omega^{-1}eq^{-1}$, ref; Manual of Chemistry published by Japanese Chemical Society). Therefore, particularly as the thickness W of the diluting compartment increases, the difference of the mobilities between $H^+$ and $OH^-$ increases so that $H^+$ tends to be unilaterally discharged to the concentrating compartments and $OH^-$ tends to remain in the diluting compartment. Furthermore, $Na^+$ and $K^+$ also tend to remain in the diluting compartments because $H^+$ ion carries the electrical charge, while the multi-valent cations and anions including $Ca^{2+}$, $Mg^{2+}$ are discharged to the concentrating compartments with relatively ease. As a result, the product water tends to include monovalent alkali such as NaOH and KOH so that the product water is increased in pH.

By the same reason, the concentrated water becomes acidic because of the tendency of $OH^-$ to remain in the diluting compartment and the tendency of $H^+$ to be discharged from the concentrating compartment. Therefore, the electrodeionization apparatus is free of scale even though ions such as $Ca^{2+}$ and $Mg^{2+}$ are concentrated at high concentration.

The electrodeionization apparatus of the present invention may be provided with a cation exchange membrane between the anode and the anion exchange membrane of the diluting compartments nearest to the anode, so that the concentrating compartments is formed between the cation exchange membrane and the diluting compartment nearest to the anode, and the anodic compartment is formed between the cation exchange membrane and the anode.

In the electrodeionization apparatus, the cation concentration in the cathodic compartment is high and the electric resistance between the electrodes is low, whereby the voltage applied to cells is decreased. To prevent formation of scale in the cathodic compartments, the electrodic water fed into the cathodic compartment is decreased in pH (or, the electrodic water is made acidic). For this purpose, the thickness of the diluting compartment is increased to decrease pH of the water which flows out from the concentrating compartments and then flows into the cathodic compartment as the electrode water.

The electrodeionization apparatus of the present invention is useful for a foremost electrodeionization apparatus of the apparatus for producing purified water in which two or more electrodeionization apparatuses are connected in series so as to make treatment of the feed water at plural stages. When feed water having conductivity of 10 $\mu$S/cm and including silica 200 ppb and boron of 20 ppb flows through the first electrodeionization apparatus of the present invention and then flows through the second conventional electrodeionization apparatus, the water flowing out from the second electrodeionization apparatus has electrical resitivity of equal to or more than 18 M$\Omega$·cm and includes silica and boron of equal to or less than 0.1 ppb as like as the theoretical pure water. Since the preceding first electrodeionization apparatus removes the hardness such as $Ca^{2+}$ and $Mg^{2+}$, the succeeding second electrodeionization apparatus is free of scale and has the water recovery of equal to or more than 95%. The concentrating compartment of the preceding first electrodeionization apparatus produces the acidic water and the concentrating compartment of the succeeding electrodeionization apparatus produces the alkaline water. These acidic water and alkaline water may be mixed together and be fed back to the preceding RO apparatus.

The electrodeionization apparatus of the present invention may be provided with thick cells having a thickness of equal to or more than 7 mm and thin cells having a thickness of less than 7 mm as shown in FIG. 7 and FIG. 8 so that the water flows through from the thick diluting compartment to the thin cell in series.

BRIEF DESCRIPTION OF THE DRAWINGS

FIG. 3 is an cross-sectional view showing a structure of a conventional electrodeionization apparatus.

FIG. 4 is a system diagram of a conventional apparatus for producing pure water.

DETAILED DESCRIPTION OF THE PREFERRED EMBODIMENTS

Figure 1:
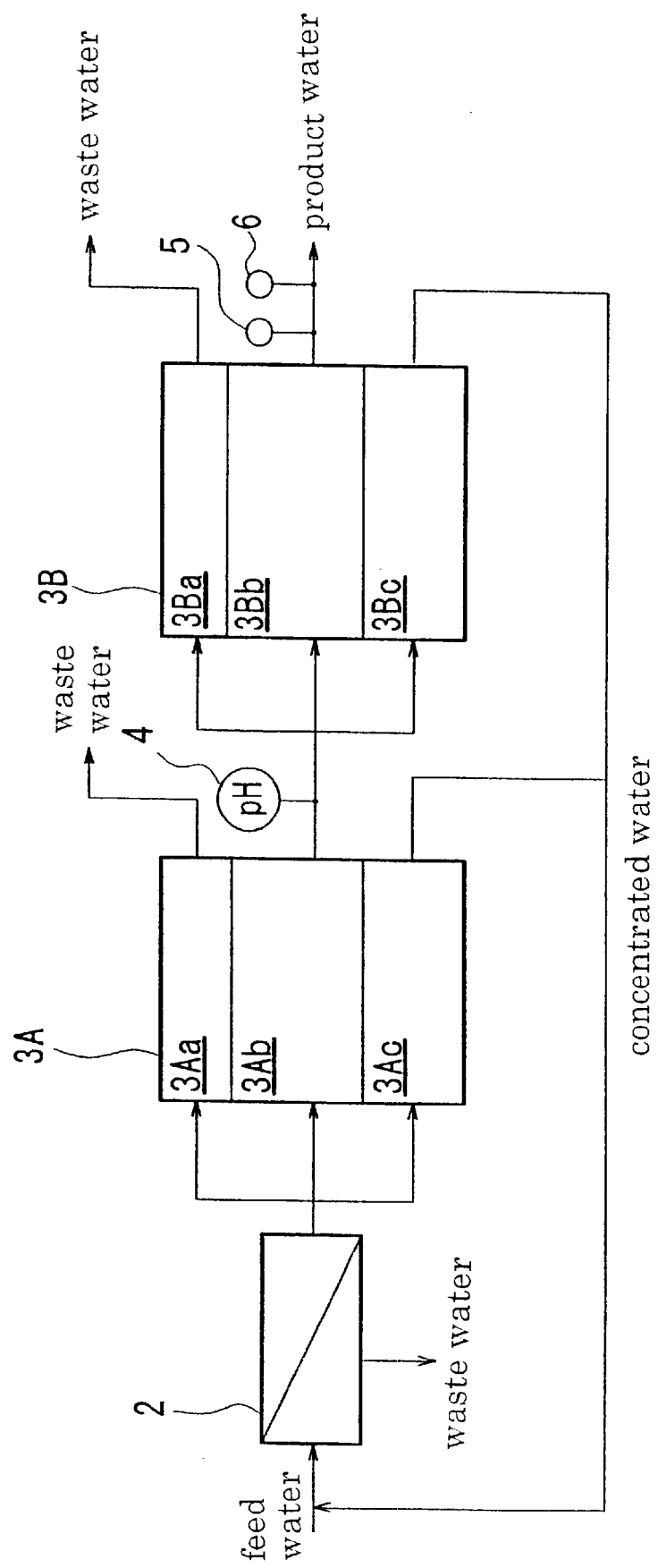
FIG. 1 is a system diagram of an electrodeionization apparatus and an apparatus for producing purified water of the present invention according to an embodiment.

Hereinafter, a preferable embodiments of an electrodeionization apparatus of the present invention will described in detail.

The electrodeionization apparatus of the present invention is so constituted that the electrodeionization apparatus can produces the product water having pH higher than that or the feed water by 1.0 or more, preferably by about 1.3 to 3.0 when the feed water has pH of equal to or less than 8.5 without adding alkaline agents.

The electrodeionization apparatus of the present invention efficiently removes the weakly-ionized species including silica and, boron, and the hardness by increasing pH of the water in the electrodeionization apparatus.

The electrodeionization apparatus of the present invention is preferable to employ the following constitutions i) and ii):
i) The diluting compartment of the electrodeionization apparatus is preferable to have a thickness of equal to or more than 7 mm, and more preferably 8 to 30 mm. The diluting compartments has the thickness W of the diluting compartment 16 arranged between an anode 11 and a cathode 12 as shown in FIG. 3.
ii) The ion exchanger filled in the diluting compartments is most preferably the mixture of the anion exchanger and the cation exchanger. When applied with high voltage, the ion exchanger may be the anion exchanger alone. Some of the diluting compartments may be filled with the mixture of the ion exchangers, and the others may be filled with the anion exchanger alone.

The electrodeionization apparatus wherein a certain zone in the diluting compartment is filled with the cation exchanger and the other zone in the diluting compartment is filled with the cation exchanger is unpreferable in resistivity of the product water and makes pH thereof neutral even when the thickness of the diluting compartment is more than 7 mm. This is because the monovalent cation including sodium ion is removed by the cation exchanger.

The ion exchangers may be filled in the concentrating compartments in the first, second or later electrodeionization apparatus, whereby the voltage applied to the cells may be decreased so that the electric power consumption decreases.

The treatment made under conditions where the concentrating compartments are filled with the ion exchangers and the cells are applied with the voltage at 3 to 6 V per cell is almost the same as that made under conditions where the concentrating compartments are not filled with any ion exchangers and cells are applied with the voltage at 15 V per cell.

The ion exchangers may be the ion exchange resin in the form of beads or fibers, the graft polymerized exchanger in which exchanging groups are introduced into fibers or nonwoven sheet by graft porymerization, or the like.

For the purpose of providing the product water of good quality, the ion exchanger is preferable to be in the form of the beads having uniform size. The bead-shaped ion exchange resin represents that 90% of the beads fall within 10% of the average bead diameter and the relative average diameter between the anion exchange resin and the cation exchange resin is at least 0.8.

It is most preferable to operate the electrodeionization apparatus employing aforementioned constitutions i) and ii) in the manner as follows.

The cells of the diluting compartments are applied with the voltage at 1 to 50 V per cell, preferably at 6 to 50 V per cell, most preferably at 10 to 30 V per cell. The water flows at a space velocity (SV) of 30 to 150 per hour, preferably at SV of 50 to 100 per hour. When the applied voltage is too low or when SV is too high, monovalent anions including chloride ion, silica and boron leak into the product water. Conversely, when the applied voltage is too high or when SV is too low, the monovalent cations are too much removed.

When pH is equal to or more than 9.0 in the diluting compartment of the electrodeionization apparatus, silica and boron are easily removed.

The diluting compartments having uneven cells can make pH equal to or more than 9 in the diluting compartments. Specifically, the rate of the thickness of the cell near the out let to the maximum thickness of the cell is equal to or less than 0.6.

While the ion exchange membrane employed in the present invention may be either homogeneous or heterogeneous, the rate of leakage of $Na^+$ of the heterogeneous membrane exceeds that of the homogeneous membrane, so that the product water is increased in pH. Therefore, the cation membrane is preferable to be heterogeneous. The anion membrane is preferable to be homogeneous so as to maintain the removing rate of silica and boron.

When the ratio of electrical resistance of the anion exchange membrane to that of the cation exchange membrane is equal to or less than 0.8, $Na^+$ is easily removed.

Especially when the electrodeionization apparatus having aforementioned constitutions in which the diluting compartments having a thickness of 10 to 20 mm is filled with the mixture of the anion exchange resin and the cation exchange resin, the water flows at SV of 50 to 100 per hour and the applied voltage is taken as 10 to 30V per cell, the hardness is removed by more than 50% and the weakly-ionized species including the silica and the boron are removed by more than 90%.

The electrodeionization apparatus may have the same structure as the conventional electrodeionization apparatus except for the aforementioned constitutions.

The water to be fed into the electrodeionization apparatus of the present invention is preferable to be the water containing silica and/or boron prepared by treating the tap water, the river water, the ground water and the like with the reverse osmosis membrane apparatus.

The electrodeionization apparatus of the present invention is preferably operated in such a condition that the scale index SI is 500 or less. The scale index is obtained by the following expression: Scale Index SI=[Load per unit area of membrane of inorganic carbonate $(mg\text{-}CO_2/hr\cdot dm^2)]\cdot[Ca^{2+}$ concentration in concentrated water $(mg\text{-}CaCO_3/L)]$ wherein "Load of inorganic carbonate per unit area of membrane $(mg\text{-}CO_2/hr\cdot dm^2)$" is, as follows, a load $(mg\text{-}CO_2/hr)$ per 1 $dm^2$ of the anion exchange membrane of the electrodeionization apparatus, and "$Ca^{2+}$ concentration in concentrated water" is $Ca^{2+}$ concentration (converted to $CaCO_3$) in the water flowing out of the concentrating compartment.

$$\begin{pmatrix} \text{Load per unit area of membrane} \\ \text{of inorganic carbonate} \\ (mg\text{-}CO_2/hr\cdot dm^2) \end{pmatrix} = \\ \frac{\begin{pmatrix} \text{concentration} \\ \text{of } CO_2 \text{ in feed} \\ \text{water (mg/L)} \end{pmatrix} \cdot \begin{pmatrix} \text{flow rate of feed} \\ \text{water in a} \\ \text{compartment (L/hr)} \end{pmatrix}}{\text{area of anion exchange membrane}(dm^2)}$$

The inventors of this invention conducted experiments for making clear the forming mechanism of scales in the electrodeionization apparatus. In the experiments, scales were intentionally formed by mixing excessive amounts of inorganic carbononate and $Ca^{2+}$ in feed water to the electrodeionization apparatus. After that, the apparatus was disassembled and the concentrating compartment was observed. As a result, it was found that calcium carbonate adhered to the anion-exchange membrane at the concentrating compartment side.

Accordingly, the inventors presumed that the forming mechanism of scales was as follows. That is, when the electrodeionization apparatus is in operation, pH near a surface of the anion-exchange membrane locally becomes alkaline. $CO_3^{2-}$ or $HCO_3^-$ and $OH^-$ permeating the anion-exchange membrane from the diluting compartment are concentrated near the anion-exchange membrane. In addition, $Ca^{2+}$ in water in the concentrating compartment is drawn or driven to the anion exchange membrane, so that $CO_3^{2-}$ or $HCO_3^-$ and $OH^-$ react with $Ca^{2+}$ to form scales of calcium carbonate on the anion-exchange membrane.

The inventors further studied and found that no scale forms when the scale index SI obtained by multiplying the load per unit area of inorganic carbonate of the anion-exchange membrane by the $Ca^{2+}$ concentration in concentrated water is 500 or less. The load of inorganic carbonate $(mg\text{-}CO_2/hr)$ of the electrodeionization apparatus is obtained by multiplying the inorganic carbonate concentration $(mg\text{-}CO_2/L)$ of water fed to the electrodeionization apparatus by the flow rate (L/hr). Therefore, the load of inorganic carbonate per unit area $(mg\text{-}CO_2/hr\cdot dm^2)$ is the product of [the inorganic carbonate concentration $(mg\text{-}CO_2/L)$ of feed water] and [the flow rate per cell(L/hr)/the effective area of cells of the anion exchange membrane $(dm^2)$].

By controlling the scale index SI to be 500 or less, preferably 200 or less, precipitation of scales of calcium carbonate can be securely prevented in the concentrating compartment of the electrodeionization apparatus, thus enabling the stable operation of the electrodeionization apparatus for a long period of time.

In the electrodeionization apparatus, electric current more than the theoretical amount required to discharge ions from feed water is supplied to cause dissociation of water in the diluting compartments so as to continuously regenerate the ion exchanger. Therefore, increase in electric current to be supplied increases the alkalinity of the pH at the surfaces of anion-exchange membranes, facilitating the precipitation of calcium carbonate. Accordingly, the permissible SI varies according to the value of electric current.

In the electrodeionization apparatus which is directed to produce water having resistivity of about 10 MΩ·cm, the SI not exceeding 200, preferably not exceeding 150, is enough, when the required removing rate of silica is less than 90% or when the current efficiency during its operation exceeds 20%. In view of economic consideration, the SI is preferably in a range between 80 and 200 to avoid treatment by a degassing apparatus, a softener, and/or such other extra device.

In the case of an electrodeionization apparatus in which the required removing rate of silica is 90% or more i.e. the current efficiency during its operation is 20% or less, the SI is preferably 120 or less, particularly 80 or less. In view of economic consideration, the SI is preferably in a range between 50 and 120.

In case of electrodeionization apparatus in which the concentrating compartments are filled with the ion exchanger, the $OH^-$ ions permeating through the anion-exchange membrane are easy to move in the concentrating compartment, so that the scale is dispersed. In this case, the permissible SI is 80 or more even preferably 80–200 when the electric current is increased. The more preferable SI in this case is in a range between 80 and 150. If economic consideration is not made, SI lower than 80 is also permissible.

To lower the SI to the specific value, there are some methods as follows. One of the methods is to lower the $Ca^{2+}$ concentration in the concentrated water by removing $Ca^{2+}$ by lowering the recovery of water or by the use of a $Ca^{2+}$ removing device such as a softener. Another method is to lower the load on the membrane surface of the inorganic carbonate by reducing the amount of the water to be treated in the electrodeionization apparatus or removing inorganic carbonate by the use of a degassing device disposed at upstream of the electrodeionization apparatus. Alternative methods of lowering the load on the membrane surface of inorganic carbonate is to control the electric current of the electrodeionization apparatus.

As the electrodeionization apparatus of the present invention is operated with recovery of water of 80% or more, the conductivity of water in the concentrating compartment should be high, thereby achieving excellent quality of treated water.

Water to be treated having $CO_2$ concentration of 10 ppm or less may be passed through a reverse osmosis apparatus before being introduced into the electrodeionization apparatus of the present invention.

Figure 14:
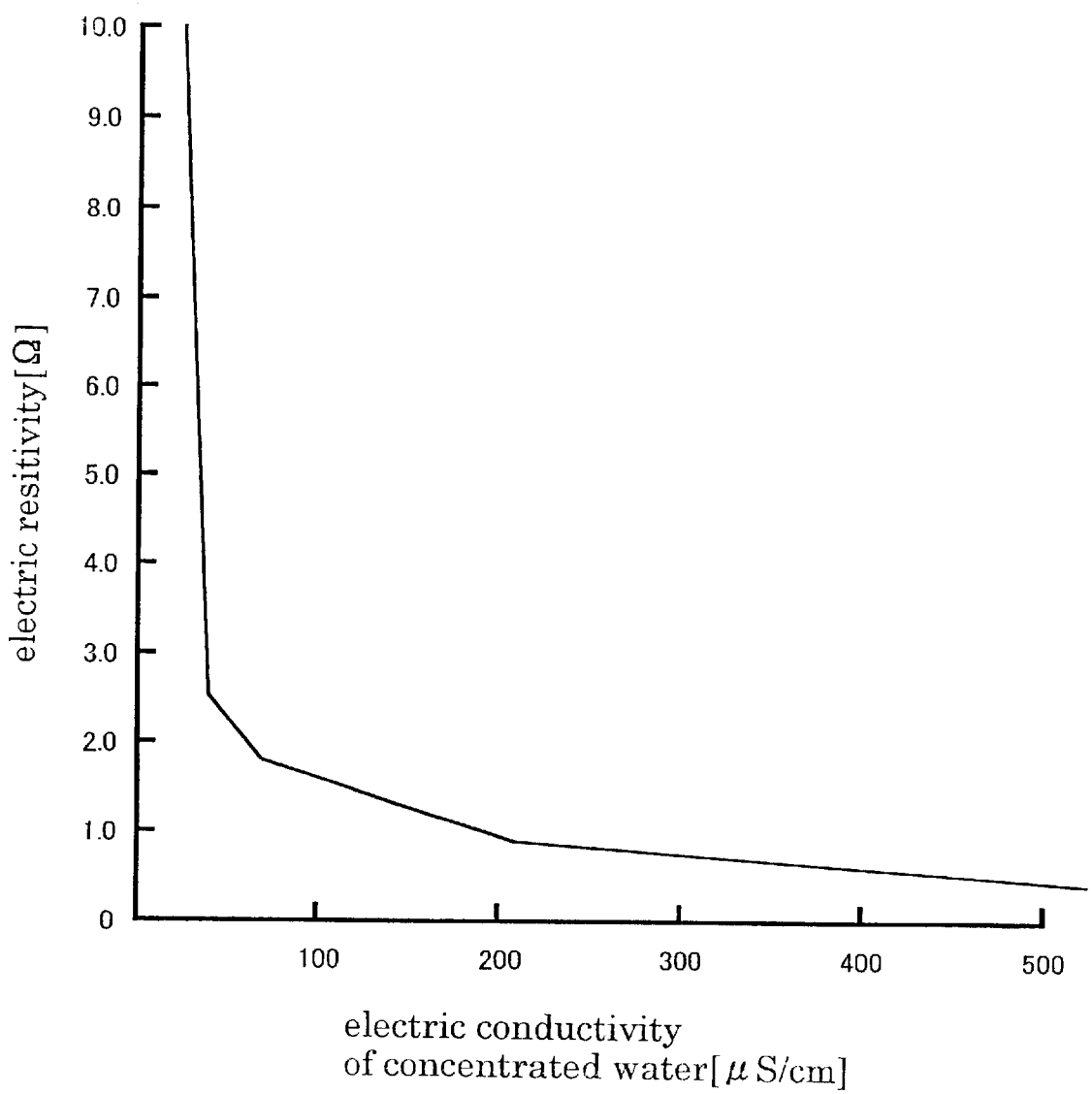
FIG. 14 is a graph showing the interrelationship between the electrical resistance and the conductivity of the concentrated water.

In the present invention, the conductivity of the water in the concentrating compartments is preferable to be equal to or more than 50 μS/cm. The interrelationship between the conductivity and the electrical resistance of the concentrated water in the electrodeionization apparatus is shown in FIG. 14. FIG. 14 shows that the electrical resistance increases rapidly as the conductivity falls below 50 μS/cm. Therefore, the conductivity of at least 50 μS/cm is required at the outlet of the concentrating compartments to ensure the electrical current. When the conductivity is below 50 μS/cm, the electrical resistance would increase to raise the electric cost.

Figure 2:
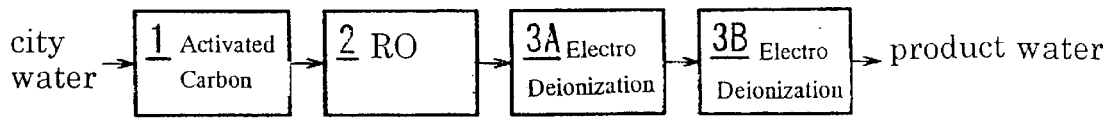
FIG. 2 is a flow diagram of an apparatus for producing purified water employed in Example 6.

Hereinafter, the apparatus for producing purified water of the present invention will be described in detail with reference to FIG. 1 and FIG. 2. FIG. 1 and FIG. 2 are invention respectively according to the embodiment.

The apparatus for producing purified water shown in FIG. 1 is a provided with a RO apparatus 2, a first preceding electrodeionization apparatus 3A and a second succeeding electrodeionization apparatus 3B which are connected in series. The apparatus for producing purified water shown in FIG. 2 is provided with an activated carbon apparatus 1, RO apparatus 2, the preceding electrodeionization apparatus 3A, and the succeeding electrodeionization apparatus 3B which are connected in series.

The preceding electrodeionization apparatus 3A is related to the present invention mentioned above.

The succeeding electrodeionization apparatus 3B is conventional electrodeionization apparatus. The thickness of the diluting compartments of the succeeding electrodeionization apparatus 3B is preferable to be smaller than that of the preceding electrodeionization apparatus 3A and to be in the range of 2.0 to 6.0 mm.

Any one of the succeeding electrodeionization apparatus may be the present invention, so that the purified water producing apparatus has a high flow rate and the purified water producing apparatus becomes compact in its constitution.

The electrodeionization apparatus of the present invention may have diluting compartments, each of which is divided into a plurality of cells by a partition member, and an ion exchanger is filled in the respective cells. At least a part of the partition member facing the cell is inclined relative to a normal flow direction of the water in the diluting compartment. The inclined part of the partition member allows permeation of the water, but prevents the ion exchanger to pass therethrough. Therefore, at least a part of the water flowing into the diluting compartment should flow obliquely relative to the normal flow direction of water, so that the water is dispersed overall the diluting compartment, thereby improving the contact efficiency between water and ion exchanger and improving the deionization property.

The water flows in the cells while being stirred by the inclined part of the member, so that a boundary layer of concentration along the surface of the membrane is small whereby a dispersion resistance of ions is lowered and the apparatus becomes possible to be operated with a high flow velocity.

In an aspect of the invention, the apparatus has a large number of cells arranged vertically and laterally. A plurality of cells are arranged along the membrane surface both in the normal flow direction of water and a direction perpendicular to the normal flow direction, thereby extremely improving the contact efficiency between water and ion exchanger. Since the height of each cell is low, the ion exchanger is scarcely compressed. A vacancy is not formed at an upper portion in the cell, and the cell is filled evenly with the ion exchanger.

The configuration of each cell seen by projecting it upon the surface of the membrane is preferably a hexagon or a quadrangle. In case of the hexagon, the cells are preferably arranged in such a manner that a pair of sides thereof extend in the normal flow direction of water. In the case of a quadrangle, the cells are preferably arranged in such a manner that the respective sides thereof extend obliquely relative to the normal flow direction of water.

All of the cells may be filled with the same ion exchanger, or instead thereof some of the cells may be filled with ion exchanger different from the ion exchanger filled in the other cells. For example, an anion exchanger may be filled in first cells, a cation exchanger may be filled in second cells, and an amphoteric ion exchanger (or a mixture of the anion exchanger and the cation exchanger) may be filled in third cells.

This electrodeionization apparatus may be installed at the succeeding stage of the purified water producing apparatus of the present invention, whereby monovalent cations such as $Na^+$ leaked from the preceding stage are removed by the succeeding electrodeionization apparatus even when the feed water is fed at a high rate.

Figure 9:
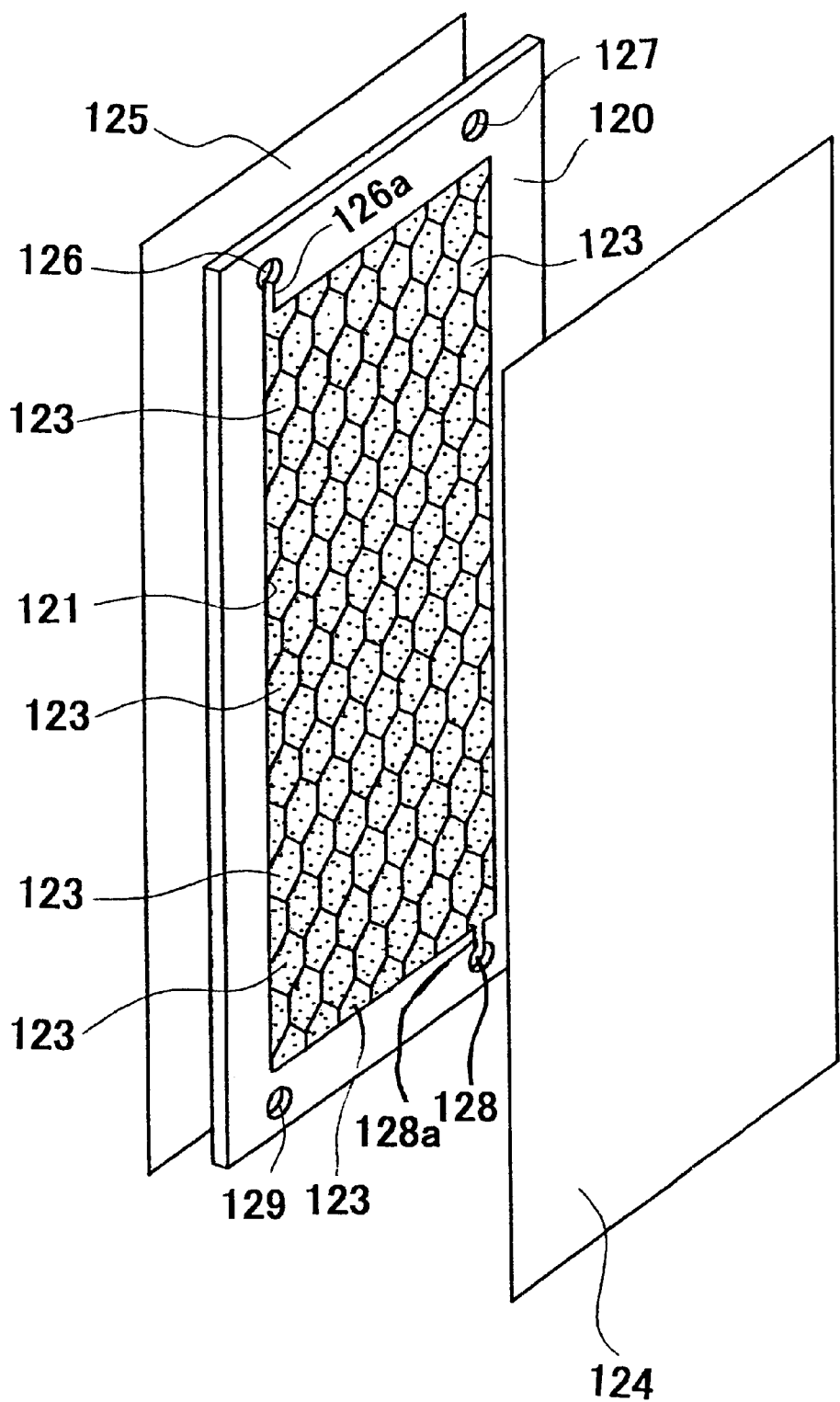
FIG. 9 is an exploded perspective view of a diluting compartments according to the other embodiments.
Figure 10:
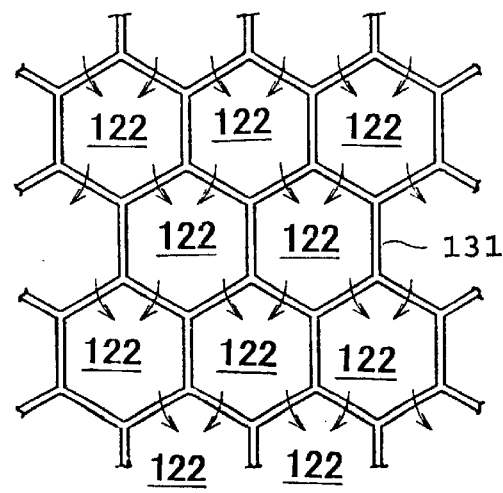
FIG. 10 is a front view showing a partition member under situations where the water flows along the partition member.

Hereinafter, other embodiments of the present invention will be described with reference to the attached drawings. FIG. 9 is an exploded perspective view showing the structure of a diluting compartment according to another embodiment, and FIG. 10 is a front view illustrating the water flowing condition of the partition member.

The diluting compartment comprises a rectangular frame 120, a partition member 121 preferably having conductivity and disposed in the frame 120, an ion exchanger 123 filled in cells 122 formed by the partition member 121, an anion-exchange membrane 124 and a cation exchange membrane 125 which are disposed to sandwich the frame 120. The partition member 121 may be electrically-conductive.

The frame 120 is provided with a flow inlet 126 for introducing raw water to be treated and a flow inlet 127 for concentrated water in an upper portion thereof and with a flow outlet 128 for deionized water and a flow outlet 129 for concentrated water formed in a lower portion thereof. The flow inlet 126 and the flow outlet 128 are connected to the inside of the frame 120 through a notch-like channels 126a, 128a, respectively.

Though only one channel 126a is illustrated to communicate with only the left top cell in FIG. 9, actually a plurality of channels 126a are formed in the upper portion of the frame 120 to uniformly distribute the raw water into the respective top cells aligned in the lateral direction, that is, the channels 126a directly communicate with the respective top cells. In the same manner, though only one channel 128a is illustrated to communicate with only the right bottom cell in FIG. 9, actually a plurality of channels 128a are formed in the lower portion of the frame 120 so as to directly communicate with the respective bottom cells.

The partition member 121 according to this embodiment is in a honeycomb form of a hexagonal shape in which a large number of cells are arranged in vertical and lateral directions in such a manner that a pair of sides of each cell 122 extend in the longitudinal direction of the frame 120, i.e. in the vertical direction. The vertical surfaces 131 may be permeable or not permeable to water.

When the vertical surfaces 131 are not permeable to water, uniform contact between water and the ion exchanger in the cells can be achieved so that the quality of product water is improved.

Figure 12:
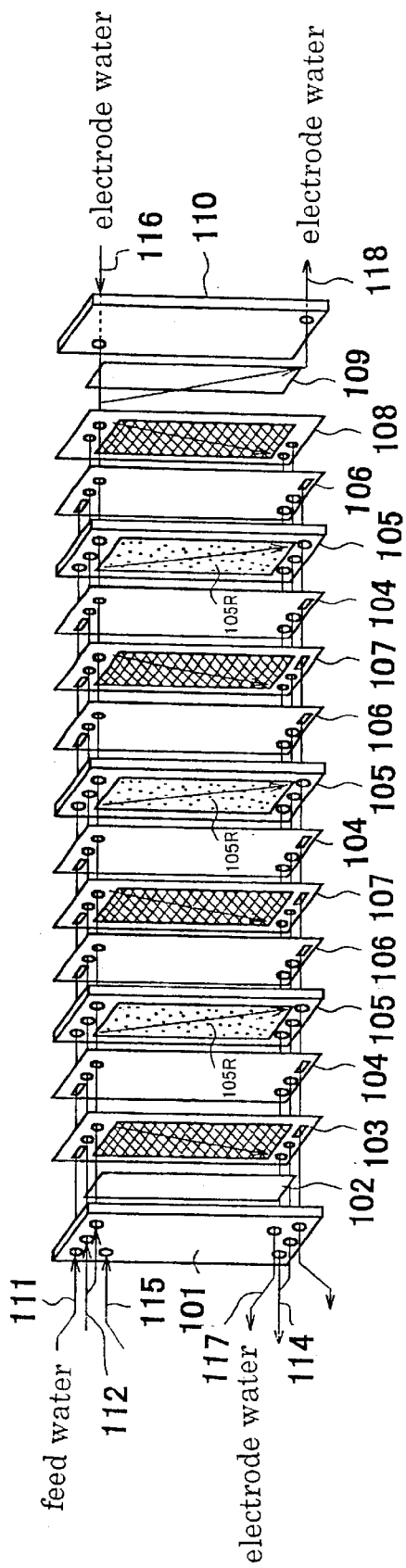
FIG. 12 is an exploded perspective view of a conventional electrodeionization apparatus.

The other structure of the electrodeionization apparatus having this diluting compartment is the same as that of the aforementioned conventional one of FIG. 12 and the flow passages for raw water, concentrated water, and electrode water are also the same as those of the conventional one.

As shown in FIG. 12, a cathode compartment is formed and defined by the cathode, the cathode spacer, and the cation-exchange membrane.

When the deionizing operation is conducted by passing raw water through this electrodeionization apparatus, the raw water introduced into the diluting compartment permeates the partition member 121 surrounding the cells 122 so as to flow into adjacent cells 122 and thus gradually flows downwardly. During this, the water is deionized. Finally, the water reaches the bottom of the diluting compartment and flows out to the flow outlet 128 through the channels 128a. Through the flow outlet 128, the water is taken out from the electrodeionization apparatus as the deionized water.

The general flow direction of water in the diluting compartment is a downward vertical direction because the channels 126a for introducing raw water exist at the top of the frame 120 and the channels 128a for taking out the deionized water exist at the bottom of the frame 120. The partition 121 is inclined relative to the general flow direction of water at upper portions and lower portions of the respective cells, so that the water flows obliquely and downwardly from one cell 122 into the lower left cell 122 and the lower right cell 122. Therefore, the water flows substantially uniformly to all cells 122, thereby improving the contact efficiency between the water and the ion exchanger.

In this diluting compartment, since the cells 122 are relatively small, the downward pressure applied to the ion exchanger in each cell by the self weight of the ion exchanger and water pressure is low. Therefore, the ion exchanger is not compressed in any of the cells 122, thereby preventing the ion exchanger from being partially compressed at the lower portion of the cells.

Employed as the ion exchanger to be filled in the cells 122 may be an anion exchanger, a cation exchanger, an amphoteric ion exchanger, or a mixture of at least two of them.

Figure 11:
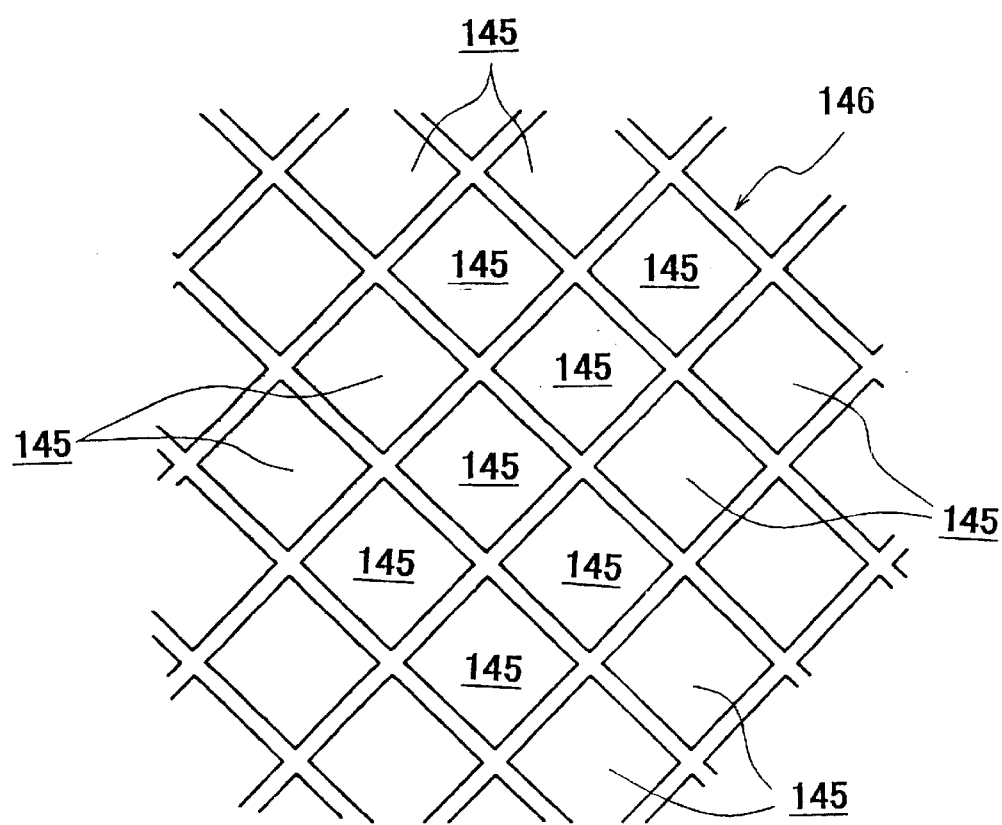
FIG. 11 is a font view showing an example of the partition member.

Though the cells are hexagonal in FIGS. 9 and 10, the partition member 146 may have cells with quadrangular, e.g. rhombic just like cells 145 shown in FIG. 11.

In the electrodeionization apparatus of the present invention, the projected area to the ion exchange membrane of the cells is preferably 1–100 $cm^2$, particularly 2–50 $cm^2$, more particularly 3–10 $cm^2$. As the size of the cells is reduced, the amount of the ion exchanger to be filled in one cell is reduced so that the fluidization of the ion exchanger is restrained. In addition, the strength of the partition member and the strength of the diluting compartment are increased. However, the pressure loss of the water flowing in the diluting compartment is increased.

The ion exchanger to be filled is normally an ion exchange resin. But the ion exchanger may be an ion exchange fiber, ion exchange non-woven fabric, or a mixture of an ion exchange resin and an ion exchange fiber. Ion conductor such as conductive resin may be employed.

When the thickness of the diluting compartments of preceding electrodeionization apparatus 3A is equal to or more than 7 mm, particularly in the range of 8 to 30 mm, and the thickness of the diluting compartments of the succeeding electrodeionization apparatus 3B is in the range of 2.0 to 6.0 mm, the preceding electrodeionization apparatus 3A removes the weakly-ionized species including silica, boron, and the hardness, and the succeeding electrodeionization apparatus 3B further removes silica and boron. The succeeding electrodeionization apparatus 3B removes the alkalis leaked from the preceding electrodeionization apparatus 3A, the product water becomes high quality.

The water to be fed into the preceding electrodeionization apparatus is preferable to contain $Na^+$ of equal to or more than 0.1 ppm as $Na^+$. When the water is poor in $Na^+$, the water is preferably added with NaCl.

Figure 15:
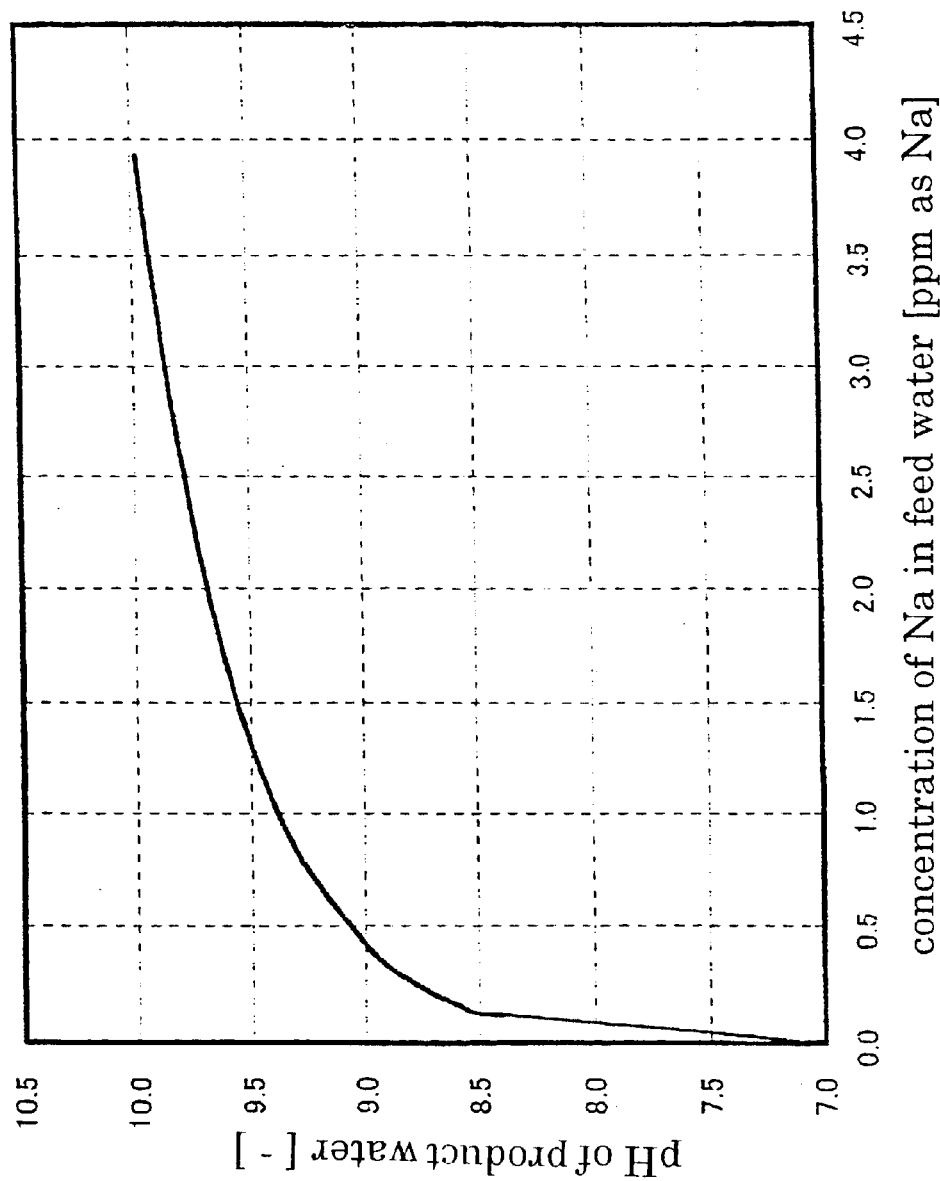
FIG. 15 is a diagram showing the interrelationship between the concentration of $Na^+$ included in the feed water to be fed into a preceding electrodeionization apparatus and pH of the product water treated by the preceding electrodeionization apparatus.

To raise pH of the product water flown out of the preceding electrodeionization apparatus 3A, the feed water needs to contain $Na^+$ ion. The relationship between the concentration of $Na^+$ in the feed water and pH of the product water is shown in FIG. 15. As shown in FIG. 15, the concentration of $Na^+$ is required to be equal to or more than 0.1 ppm as $Na^+$, preferably in the range of 0.5 to 4 ppm as $Na^+$.

The concentration of $CO_2$ in the water to be fed into the preceding electrodeionization apparatus is preferable to be equal to or less than 3 ppm as $CO_2$.

When the raw water contains a large amount of $CO_2$ which dissociates under alkaline condition, the removing rates of silica and boron decrease. When the concentration of $CO_2$ exceeds 3 ppm, it is preferable to remove $CO_2$ by the use of a degassing apparatus installed in the upstream or by increasing pH of the water fed into the RO apparatus to 8 or more to form $HCO^{3-}$.

The water recovery rate of preceding electrodeionization apparatus 3A is preferable to be 60 to 90%. Even when the water recovery rate of succeeding electrodeionization apparatus 3B is equal to or more than 95%, for example the rate is in the range of 95 to 99%, the product water of good quality is produced without causing scale.

As the electrical voltage and current applied to the preceding electrodeionization apparatus 3A are increased, pH of the water treated in the preceding electrodeionization apparatus becomes high. Therefore, it is preferable to observe pH by installing a pH meter 4 to the pipe for discharging the treated water from preceding electrodeionization apparatus 3A and to control the voltage and the current applied to the preceding electrodeionization apparatus 3A so that the value of pH becomes preferably equal to or more than 8.5, more preferably between 9.0 and 10.5. The preceding electrodeionization apparatus 3A is preferable to remove $Na^+$ at a rate of less than 90% and the chloride ion of more than 95%. When the chloride removing rate is more than 95%, pH becomes high.

It is preferable that a resistivity meter 5 and a silica meter 6 are installed to the pipe for discharging the product water from the succeeding electrodeionization apparatus 3B in order to observe the resistivity and the concentration of silica of the water product in the succeeding electrodeionization apparatus 3B, and the voltage and the current applied to the apparatus 3A and/or the apparatus 3B are controlled so that the resistivity and the concentration of the silica are in the sights.

When the electrodeionization apparatuses 3A, 3B are operated at A/(Q·SV) of equal to or more than 4000, the removing rates of the silica and the boron are increased.

The "A", "Q", and "SV" are as follows:

A: the operational current (A);

Q: the flow rate of the feed water per cell in the diluting compartments (L/sec), where "L" is liter; and SV: the flow rate of the feed water per ion exchangers in the diluting compartments (L/L-ion exchangers·sec).

The removal rate of silica is closely related to the value of A/(Q·SV). A/(Q·SV) of 4000 or more can achieve the silica removing rate of 97% or more.

The apparatus for producing purified water of the present invention may by provided with a RO apparatus, a degassing apparatus where the permeating water passing thorough the RO apparatus is introduced, and the electrodeionization apparatus where the water treated in the degassing apparatus is introduced. It is preferable that the feed water having M-alkalinity expressed as $CaCO_3$ of more than 20 ppm and pH of or more than 6.5 is fed to the RO apparatus, and that the water having pH of less than 6.2 is taken out from the RO apparatus and fed into the degassing apparatus.

It is preferable that the degassing apparatus is a membrane degassing apparatus and the water to be introduced to the degassing apparatus has TOC of less than 200 ppb or conductivity of less than 20 $\mu$S/cm.

The M-alkalinity in the feed water is removed by the RO apparatus, so that the permeating water thereof has low pH.

The water having low pH is efficiently removed in $CO_2$ by the degassing apparatus, so that the electrodeionization apparatus can be reduced in the load of $CO_2$ loaded thereon.

The ability to remove $CO_2$ can be improved by 30 to 50% by degassing the water which is decreased in pH by treating with the RO apparatus in comparison with the case where the water is degassed before the treatment with the RO apparatus.

Particularly when the membrane degassing apparatus is employed for the degassing apparatus, the degassing apparatus arranged behind the RO apparatus can stabilize the ability to degas for a long period of time.

This is because the RO apparatus removes salts and TOC (total organic carbon), so that slime defects caused by the salts and the TOC are avoided. It is preferable that the feed water into the membrane degassing apparatus has the TOC concentration of less than 200 ppb, and/or the electric conductivity of 20 $\mu$S/cm in order to prevent the membrane from contamination and to stabilize the degassing ability for a long period.

The reject water of the RO apparatus 2 is discharged as the drain and the permeated water of the RO apparatus 2 is distributed and fed into the electrodic compartment 3Aa, the diluting compartments 3Ab and concentrating compartments 3Ac of the preceding electrodeionization apparatus 3A respectively. The product water of the preceding electrodeionization apparatus 3A (the water flowing out from the diluting compartments 3Ab) is distributed and fed into the electrodic compartment 3Ba, the diluting compartments 3Bb and the concentrating compartments 3Bc of the succeeding electrodeionization apparatus 3B respectively. The water flowing out from the diluting compartments 3Bb is discharged as the product water. The water flowing out from the electrodic compartments 3Aa and 3Ba is discharged as the drain.

The concentrated water flowing out from the concentrating compartments 3Ac of the preceding electrodeionization apparatus 3A is acidic, and the concentrated water flowing out from the concentrating compartments 3Bc of the succeeding electrodeionization apparatus 3B is alkaline. Therefore, it is preferable that the concentrated water flowing out from the concentrating compartments 3Ac and 3Bc are mixed and returned to the inlet portion of the RO apparatus 2.

The concentrated water of either preceding electrodeionization apparatus 3A or succeeding electrodeionization apparatus 3B may be independently fed back to the front stage of the RO apparatus 2. The concentrated water of the succeeding electrodeionization apparatus 3B may be fed back to the inlet portion of the preceding electrodeionization apparatus 3A.

While the electrodeionization apparatus shown in FIG. 1 and FIG. 2 has one electrodeionization apparatus 3B, the electrodeionization apparatus may be provided with two or more electrodeionization apparatuses 3B which are connected in series.

Figure 7:
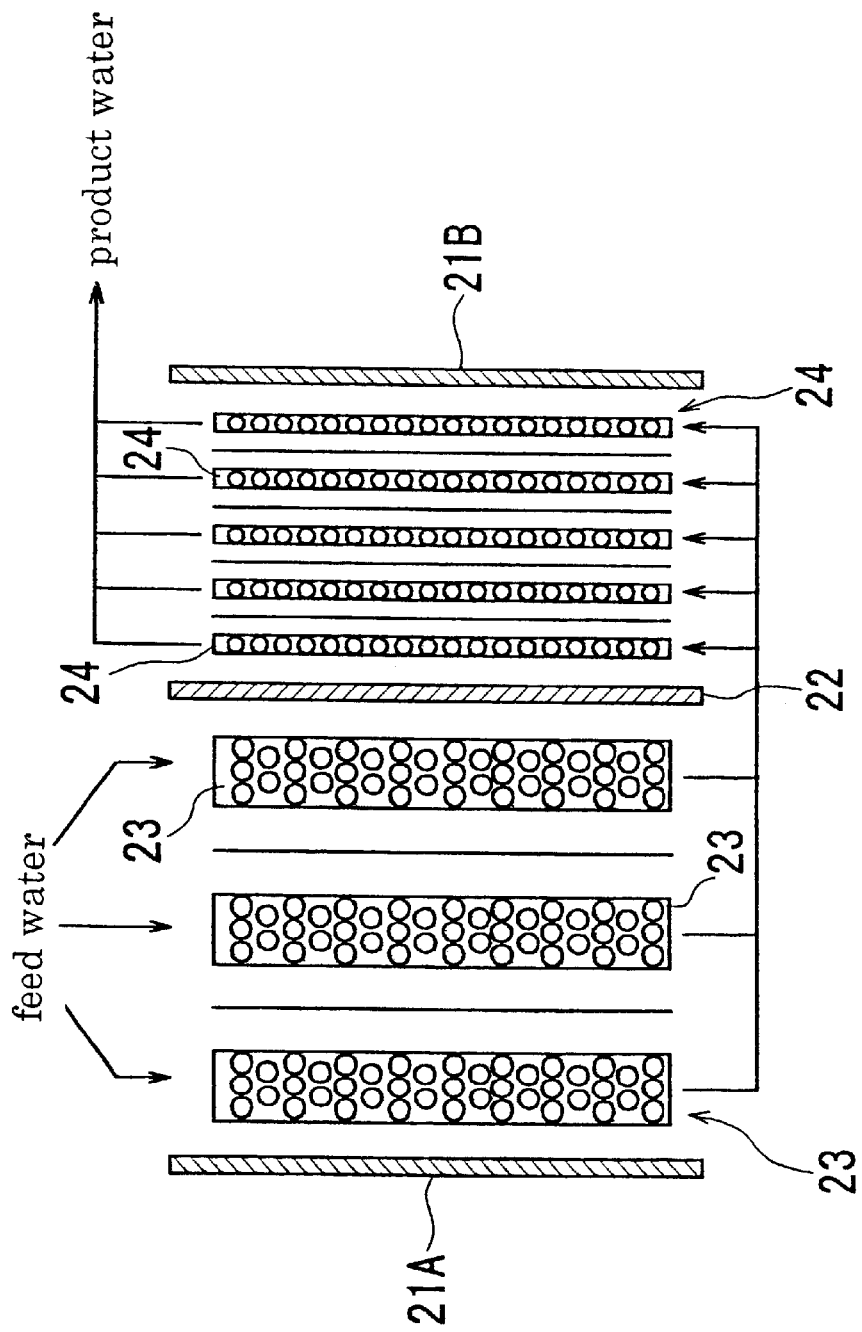
FIG. 7 is a crosssectional view of an electrodeionization apparatus of the present invention according to another embodiment.
Figure 8:
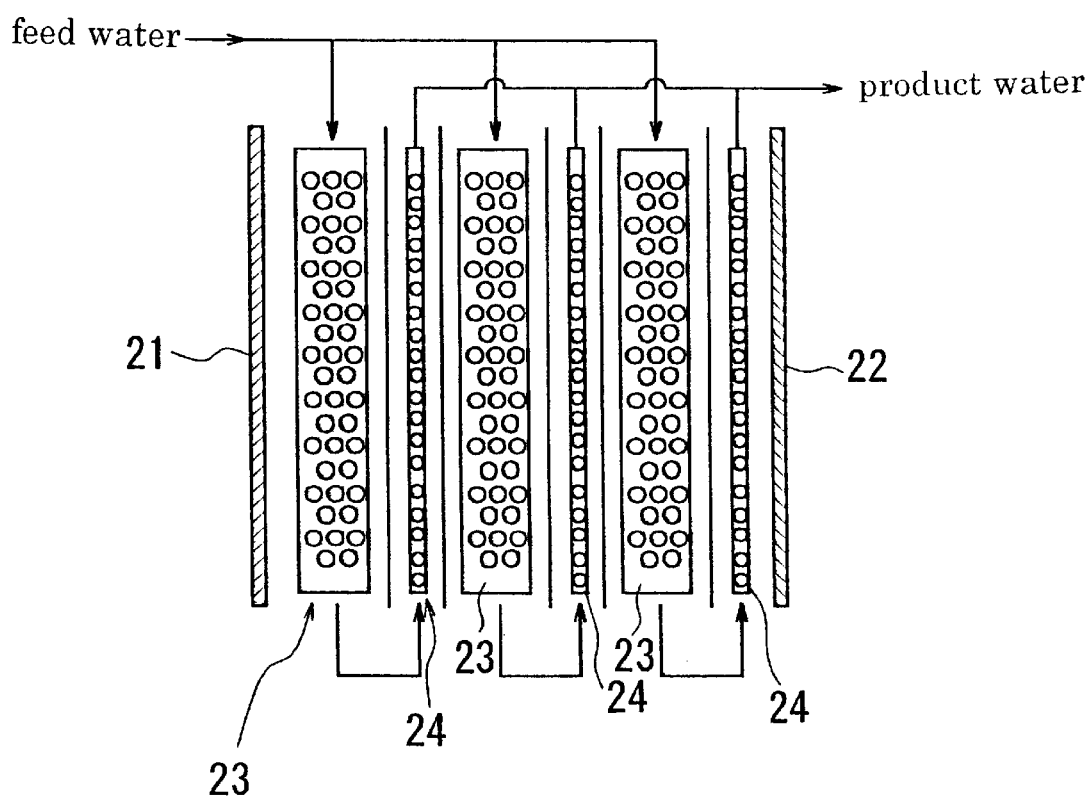
FIG. 8 is a cross-sectional view of an electrodeionization apparatus of the present invention according to the other embodiment.

As shown in FIG. 7 and FIG. 8, cells 23 of more than 7 mm in the thickness of diluting compartments and cells 24 of less than 7 mm in the thickness of the diluting compartments may be arranged between an anode 21 (or 21A, 21B) and a cathode 22 so that the fed water flows through these cells in series.

The electrodeionization apparatus of the present invention is preferably operated so that the concentration of silica of the concentrated water flowing out from the concentrating compartments of the second or later electrodeionization apparatus is less than one thousand times as high as that of the produced water of the electrodeionization apparatus. In order to lower the concentration of silica of the produced water to 0.1 ppb or less, the concentration of silica of the concentrated water is preferable to be decreased to 100 ppb or less.

When the electrodeionization apparatus is operated in this manner, since the concentration gradient of silica from the concentrating compartments to the diluting compartments is relatively low even in the vicinity of the outlet of the concentrating compartments, the diffusion of silica from the concentrating compartments to the diluting compartments is retarded so that the concentration of silica of the produced water is reduced.

In the present invention, the apparatus for producing purified water may be composed of a RO apparatus, a first electrodeionization apparatus and a second electrodeionization apparatus so that the water firstly flows from a reverse osmosis membrane apparatus into the first apparatus and then flows into the second electrodeionization apparatus wherein the reverse osmosis membrane apparatus consists of the reverse osmosis membrane having the degree of desalination of monovalent salts of equal to or less than 97%.

Hereinafter, "the degree of desalination of monovalent salts" will be simply called as "the degree of the desalination".

As shown in FIG. 14 mentioned above, the electrical resistance rapidly increases as the conductivity of the concentrated water of the electrodeionization apparatus falls below 50 $\mu$S/cm. The conductivity of more than 50 $\mu$S/cm, preferably more than 75 $\mu$S/cm reduces the electrical resistance and sufficiently ensures the electrical current required for deionization in the electrodeionization apparatus.

When usual tap water or industrial water having the conductivity of about 200 $\mu$S/cm is fed into the RO apparatus installed with the RO membrane having the degree of desalination of 97%, and the water is treated under water recovery of 75%, the conductivity of the water permeated through the RO membrane is defined as follows.

(Conductivity of the water permeating through RO membrane)= (200+800)/2(1−0.97)=15 $\mu$S/cm When the electrodeionization apparatus is operated at the water recovery of 80% by feeding the above water permeated through the RO membrane, the conductivity of the cocentrated water is 15×5=75 $\mu$S/cm.

While the conductivity of the concentrated water varies depending on the conductivity of the raw water to be fed into the RO apparatus, the water recovery of the electrodeionization apparatus, by employing the RO membrane having the degree of desalination of equal to or less than 97%, the concentrated water can be provided with the conductivity of roughly 75 $\mu$S/cm or more in operation employing the usual raw water and the usual water recovery and the electricalent can be ensured in the electrodeionization apparatus.

In the present invention, it is very important to feed the permeating water obtained by treating the feed water by RO membrane having relatively low degree of desalination into the diluting compartments since the conductivity of the concentrated water can not be ensured when the permeating water is fed into the concentrating compartments alone, and the results prevent decrease of the electrical resistance and improvement of the electrical current.

Furthermore, the RO membrane preferably has the removal rate of the hardness and silica of equal to or more than 97%. That is, the hardness such as by $Ca^{2+}$ and silica easily form scalesin the electrodeionization apparatus and requires appreciable electrical current to remove the scales. Therefore, the hardness and silica are preferably removed in the RO apparatus preceding the electrodeionization apparatus, so that the RO membrane having the removal rate of the hardness and silica of more than 97% is preferable to be employed.

The RO membrane mentioned above may be sold commercially. It may be prepared by being treated with oxidizer so that the RO membrane becomes hydrophilic and has the degree of desalination of equal to or less than 97% and the removal rate of silica of equal to or more than 97%.

In the present invention, the electrodeionization apparatus is preferably provided with the diluting compartments having a thickness of equal to or more than 7 mm.

That is, when the permeate water of the RO apparatus in which NaCl and the like remains is fed into the electrodeionization apparatus wherein the diluting compartments having a large thickness as above are employed and wherein the ion exchange layer comprising the anion exchanger alone or mixture of the anion exchanger and the cation exchanger is filled in the diluting compartments, the conductivity of the product water (deionized water) is almost the same as that of the feed water or slightly larger than it, while carbon dioxide gas ($CO_2$) and anions are removed and about 90% of silica and boron are also removed. Besides, the hardness including $Ca^{2+}$, $Mg^{2+}$ is further removed. However, since the monovalent cations including $Na^+$, $K^+$ are inferior in the removal rate, the alkalis including NaOH and KOH which have large molar conductivity are leaked into the product water, and the product water tends to be increased in pH and slightly in conductivity.

For the same reason as above, since $OH^-$ is difficult to be discharged and $H^+$ is easy to be discharged in the concentrating cells, pH becomes acidic therein so that the scale is not formed even when $Ca^{2+}$, $Mg^{2+}$ and the like are concentrated at high concentration.

Specifically, in order to decrease the electrical resistant and to increase the electrical current of the electrodeionization apparatus, the electrodeionization apparatus is increased in the conductivity of the concentrated water by employing the RO membrane having the degree of desalination of monovalent salts represented by NaCl of equal to or less than 97% to leak the monovalent salts into the RO permeating water so that the permeated water is fed into the diluting compartments of the electrodeionization apparatus. When the degree of desalination of RO membrane exceeds 97%, the aforementioned effect is not sufficiently achieved.

While the degree of desalination of the RO membrane is preferable to be low for the purpose of increasing the conductivity of the concentrated water of the electrodeionization apparatus so as to decrease the electrical resistance and to improve the electrical current of the electrodeionization apparatus, when the degree of desalination is unduly decreased, the decrease of the current is small and, rather, the load on the electrodeionization apparatus increases because of degradation of the quality of the feed water so that the product water (deionized water) is degraded in its quality. Therefore, RO membrane is preferable to have the degree of desalination especially of 90 to 95%.

The RO membrane as the above may employ a membrane being marketed as low desalination membrane, for example a membrane called as a loose RO membrane and a nanofiltration (NF membrane) membrane, specifically, "LES 90" and "NTR-729HF" produced by Nitto Electrical Industry Co., Ltd.

In the present invention, the RO membrane is also preferable to have the removal rate of the hardness and silica, more preferably the removal rate of TOC (total organic carbon) of equal to or more than 97%.

In the preceding electrodeionization apparatus of the purified water producing apparatus of the present invention, by the same reason as above, the electrodeionization apparatus is preferable to be provided with the diluting compartments having a thickness of equal to or more than 7 mm, particularly of 8 to 30 mm.

The ion exchanger is most preferable to be a mixture of the anion exchanger and the cation exchanger. When the applied current is increased, a single layer comprising the anion exchanger alone can provide the same effect as the mixture. Of course, a combination of the mixture and the anion exchanger may be employed.

In the present invention, an ultraviolet-light irradiating apparatus may be installed between electrodeionization apparatuses to decompose TOC in the water.

When the product water of the preceding electrodeionization apparatus is alkaline, the ultraviolet-light irradiating apparatus decompose TOC at high efficiency. When hydrogen peroxide or ozone having concentration of 2 to 20 times as high as the concentration of TOC in the water is added into the product water, the efficiency of decomposition is further increased.

In the present invention, a first RO apparatus may be installed before the preceding electrodeionization apparatus, and a second RO apparatus may be installed between the preceding electrodeionization apparatus and the succeeding electrodeionization apparatus.

By using the RO apparatus, silica and boron are easily removed from the alkaline feed water. Since the product water flowing out from the preceding electrodeionization apparatus is alkaline without adding alkalis including NaOH, the second RO apparatus easily removes silica and boron from the product water.

For example, in the apparatus comprising the first RO apparatus, the preceding electrodeionization apparatus, the second RO apparatus and the succeeding electrodeionization apparatus which are arranged in this order and connected in series, when the water flowing into the second RO apparatus has pH of 7, the second RO apparatus removes 99% of silica and 70% of boron in the water. When the water flowing into the second RO apparatus has pH of 9, the second RO apparatus removes 99.9% of silica and 97% of boron.

In the apparatus comprising the preceding electrodeionization apparatus and the succeeding electrodeionization apparatus which are connected in series, when water containing silica in a high concentration is fed into the apparatus momentarily, silica accumulates and the removal rate of silica may decrease even after the silica content of the feed water decreases down to usual. Therefore, the feed water fed into the preceding electrodeionization apparatus may be regularly added with salts including NaCl so that silica accumulated in the electrodeionization apparatus can be discharged therefrom.

By adding the salts as above, at least one of the following requirements (i), (ii), and (iii) is preferable to be achieved for 5 to 48 hours:

(i) To set the conductivity of the feed water flowing into preceding electrodeionization apparatus for more than 15 $\mu$S/cm;

(ii) To set the concentration of $Na^+$ ion of the water flowing into the preceding electrodeionization apparatus for more than 3 ppm; and (iii) To set pH of the product water flowing out preceding electrodeionization apparatus for more than 9.8.

FIG. 15 shows an example of the interrelationship between pH values of the feed water fed into the preceding electrodeionization apparatus and the product water flowing out from the therefrom.

It is further effective to heat the feed water fed into the electrodeionization apparatus to more than 35° C. besides to add the salts including NaCl to the feed water.

It the conventional electrodeionization apparatus, slime is frequently formed whereby the differential pressure of the concentrating compartments rises to prevent the operation. In the two-stages electrodeionization apparatus of the present invention, the concentrated water of the preceding electrodeionization apparatus becomes acidic and the concentrated water of the succeeding electrodeionization apparatus becomes basic without adding agents so that the slime is not formed in the concentrating compartments. Even after six months of operation, when the feed water including 10,000 of living bacteria per milliliter is fed into the preceding electrodeionization apparatus, the concentrated water of the preceding electrodeionization apparatus is decreased in the number of living bacteria to 100 per milliliter and the concentrated water of the succeeding electrodeionization apparatus is decreased in the number of living bacteria to 0 per milliliter.

To raise the removal rate of silica, the alkaline chemicals may be added into the water between the first and second stages or the inlet of the first stage. Even when pH of the water is not sufficiently increased at the first stage, the treatment with the second or later electrodeionization apparatus improves the removal rate of silica.

The feed water fed into the first electrodeionization apparatus is preferable to have pH of equal to or more than 9.5 in order to efficiently remove the weakly-ionized species including silica and boron by the second or later electrodeionization apparatus. Although the removal rate of silica is 99% when the feed water fed into the secondary electrodeionization apparatus has pH of 9.0, the removal rate of silica is 99.9% when the feed water fed into the secondary electrodeionization apparatus has pH of 9.5.

In the second or later electrodeionization apparatus, the $Ca^{2+}$ concentration in the feed water is preferable to be equal to or less than 30 ppb, more preferable to be equal to or less than 5 ppb as $Ca^{2+}$ since the water flowing in the concentrating compartments and the electrodic compartment is alkaline. In the second or later electrodeionization apparatus, the basic feed water causes the scale of $CaCO_3$ in the concentrating compartments and the electrodic compartment. Therefore, $Ca^{2+}$ is required to be removed at the first stage.

EXAMPLES AND COMPARATIVE EXAMPLES

The following shows the apparatuses used in Examples and Comparative Examples. In Examples 1 to 5 and Comparative Examples 1 to 3, the apparatuses are arranged as shown in FIG. 4 to be connected in series. In Example 6, the apparatus including two electrodeionization apparatuses are arranged as shown in FIG. 2 to be connected in series.

1) Activated carbon apparatus "Kuricoal KW 10-30" produced by Kurita Water Industries Ltd.

2) RO apparatus: "Maku-Ace KN 200" produced by Kurita Water Industries Ltd.

3) Electrodeionization apparatus "Pure-Ace PA-200" produced by Kurita Water Industries Ltd.

flow rate of product; 100 liters per hour

Comparative Example 1

An electrodeionization apparatus is assembled as shown in FIG. 3 in which the following ion exchange membranes are employed and the diluting compartments are filled with mixture of 1 parts by volume of the following anion exchange rein and 4 parts by volume of the following cation exchange resin.

The anion exchange resin and the cation exchange resin are sufficiently washed by ultra pure water before being filled in the diluting compartments. Each of the diluting compartments has a thickness of 2.5 mm and consists of 12 cells.

The water is fed into the electrodeionization apparatus under conditions as shown in Table 1. The resistivity of the product water, the concentration and the removal rate of silica, boron and the other ions are measured and results are shown in Table 1.

Anion exchange membrane: "Neosepta AHA" produced by Tokuyama Co,. Ltd

Cation exchange membrane: "Neosepta CMB" produced by Tokuyama Co,. Ltd.

:Anion exchange membrane "SA 10A" produced by Mitsubishi Chemical Corporation.

:Anion exchange membrane "SK 1B" produced by Mitsubishi Chemical Corporation.

Example 1

An electrodeionization apparatus is assembled to conduct the treatment in the same manner as comparative example 1 except that each of the diluting compartments has thickness of 10 mm and consists of three cells, and the water is fed under conditions as shown in Table 1. The resistivity of the product water, the concentrated and the removal rate of silica, boron and the other ions are shown Table 1.

Figure 5:
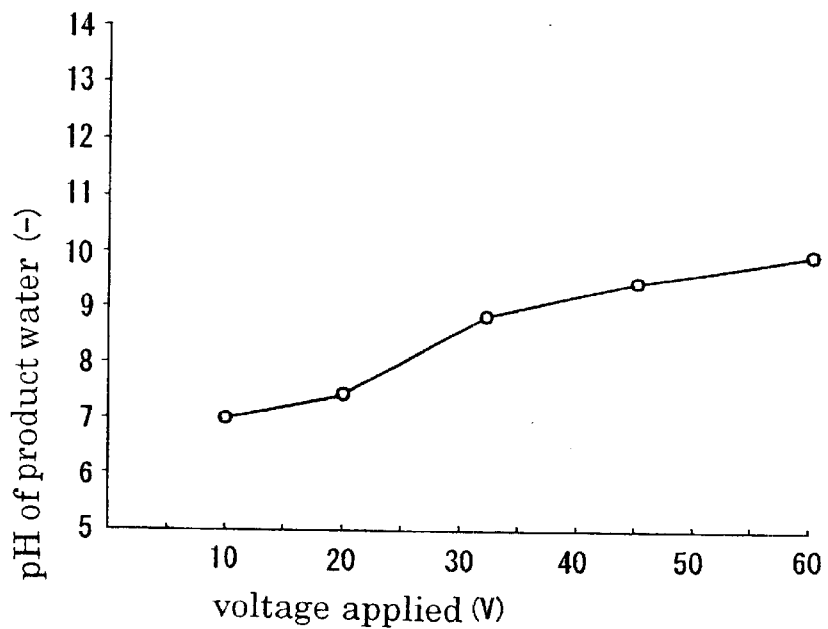
FIG. 5 is a graph showing the interrelationship between the applied voltage and pH of the product water observed in Example 1.

Further, the variation in pH with the applied voltage is shown in FIG. 5.

The $CO_2$ concentration of the feed water and the $CO_2$ concentration of the water treated by the preceding electrodeionization apparatus 3A are measured to calculate the removal rate. When the $CO_2$ concentration of the feed water is 1 ppm, the removal rate is 90%, and when the $CO_2$ concentration of the feed water is 4 ppm, the removal rate is 60% or less.

In Example 1, by employing the heterogeneous membrane for the ion exchange membrane, the removing rate of $Na^+$ decreases from 46% to 40% and pH increases from 9.5 to 9.65.

TABLE 1

|  | Comparative Example 1 | Example 1 |
| --- | --- | --- |
| feeding condition |  |  |
| number of cells [–] | 12 | 3 |
| thickness of diluting compartment [mm] | 2.5 | 10 |
| electric voltage [V] | 54 | 45.9 |
| electric current [A] | 0.8 | 2 |
| water recovery [%] | 90 | 90 |
| SV in concentrating compartment [hr$^{-1}$] | 60 | 60 |
| pH of feed water [–] | 7 | 7 |
| conductivity of feed water [μS/cm] | 10 | 10 |
| silica concentration of feed water [ppb as SiO$_2$] | 200 | 200 |
| boron concentration of feed water [ppb as B] | 19 | 20 |
| sodium concentration of feed water [ppm as Na] | 1.6 | 1.6 |
| chloride ion concentration of feed water [ppm as Cl] | 2 | 2 |
| calcium concentration of feed water [ppb as Ca] | 50 | 50 |

TABLE 1-continued

|  | Comparative Example 1 | Example 1 |
| --- | --- | --- |
| quality of product water |  |  |
| pH of product water [–] | 7 (pure water) | 9.5 |
| resistivity of product water [MΩ.cm] | 16.5 | 0.1 |
| silica concentration of product water [ppb as SiO$_2$] | 52 | 18 |
| removal rate of silica [%] | 74 | 91 |
| boron concentration of product water [ppb as B] | 5.2 | 2.5 |
| removal rate of boron [%] | 72.6 | 87.5 |
| sodium concentration of product water [ppb as Na] | 0.2 | 860 |
| chloride ion concentration of product water [ppb as Cl] | <0.1 | 10 |
| calcium concentration of product water [ppb as Ca] | <1.0 | <1.0 |

Examples 2 to 5, Comparative Examples 2, 3

Figure 6:
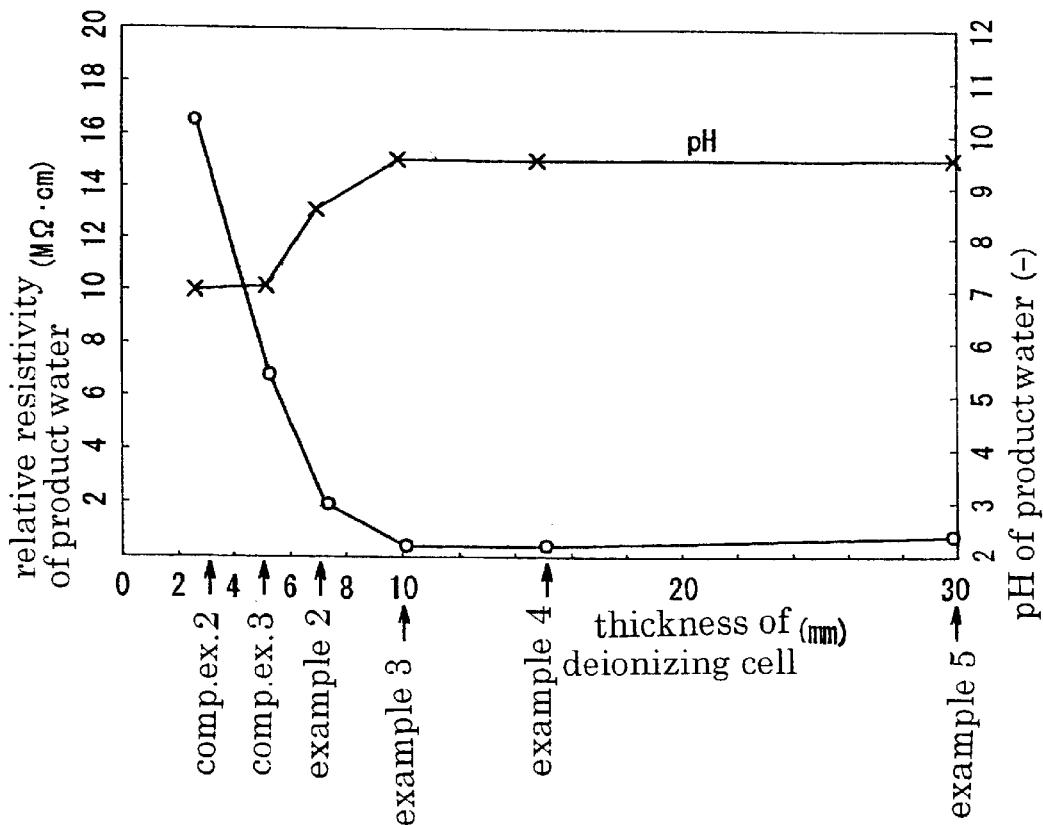
FIG. 6 is a graph showing the measurements of the resistivity and pH of the product water measured in Examples 2 to 5 and Comparative Examples 2 and 3.

Electrodeionization apparatuses are assembled in the same manner as Comparative Example 1 except that the diluting compartments of those respectively have thickness as follows. The water is treated under the same conditions as Comparative Example 1 except that the water is fed at SV of 60 per hour, and the electric voltage as the current efficiency falls in the range of 10 to 20%. The resistivity and pH of the product water are shown in FIG. 6.

Comparative Example 2: 2.5 mm

Comparative Example 3: 5.0 mm

Example 2: 7.0 mm

Example 3: 10.0 mm

Example 4: 15 mm

Example 5: 30 mm

Example 6

As shown in FIG. 2, the activated carbon apparatus 1, the RO apparatus 2 and the electrodeionization apparatus 3A, 3B are arranged in this order to be connected in series wherein the preceding electrodeionization apparatus 3A is the same electrodeionization apparatus provided with the diluting compartments having a thickness of 10 mm as Example 1 and the succeeding electrodeionization apparatus 3B is the same electrodeionization apparatus provided with the diluting compartments having thickness of 2.5 mm as Comparative Example 1. Then, the feed water is fed into the apparatus under conditions as shown in Table 2. The quality of the product water (flowing out from the electrodeionization apparatuses 3A, 3B respectively) are shown in Table 2.

TABLE 2

|  | preceding electrodeionization apparatus 3A | succeeding electrodeionization apparatus 3B |
| --- | --- | --- |
| treating condition |  |  |
| number of cells [–] | 3 | 12 |
| thickness of diluting compartment [mm] | 10 | 2.5 |
| electric voltage [V] | 45.9 | 54 |
| electric current [A] | 2 | 1 |
| water recovery [%] | 90 | 95 |

TABLE 2-continued

|  | preceding electrodeionization apparatus 3A | succeeding electrodeionization apparatus 3B |
|---|---|---|
| quality of product water |  |  |
| pH of product water [–] | 9.5 | 7 |
| resistivity of product water [MΩ.cm] | 0.1 | 18.2 |
| silica concentration of product water [ppb as $SiO_2$] | 18 | <0.1 |
| boron concentration of product water [ppb as B] | 2.5 | <0.005 |

The results show the followings:

As shown in Table 1, the electrodeionization apparatus of Example 1 provided with the diluting compartments having a thickness of 10 mm slightly exceeds the electrodeionization apparatus of Comparative Example 1 provided with the diluting compartments having a thickness of 2.5 mm in the removal rate of silica and boron. Calcium is almost entirely removed. As shown in FIG. 5, in the electrodeionization apparatus provided with the diluting compartments having a thickness of 10 mm, pH of the product water increases as the applied voltage increases.

As shown in FIG. 6, as the thickness of the diluting compartments exceeds 7 mm, the resistivity of the product water deteriorates to raise pH of the product water.

In the preceding electrodeionization apparatus 3A, the cells are applied with the voltage at 8V per cell, and in the succeeding electrodeionization apparatus 3B the cells are applied with the voltage at 3V per cell. When the conventional electrodeionization apparatuses are employed, the cells of the preceding electrodeionization apparatus are applied with the voltage of 15V and those of the succeeding electrodeionization apparatus are applied with the voltage of 4.5V.

Table 2 shows that when the water is firstly treated in the electrodeionization apparatus provided with the diluting compartments having a thickness of 10 mm and then fed into the electrodeionization apparatus provided with the diluting compartments having a thickness of 2.5 mm, the concentration of silica and boron is lowered to the limit of analytic detection, and the product water of very good quality (pH 7 and the resistivity of 18.2 MΩ·cm) can be contained.

Example 7

Figure 13:
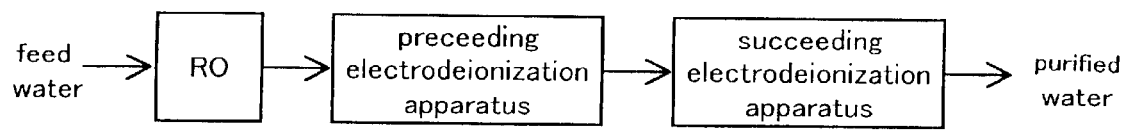
FIG. 13 is a flow diagram of an apparatus for producing purified water employed in Example 7.

The purified water producing apparatus shown in FIG. 13 is assembled. The succeeding electrodeionization apparatus relates to the present invention which is provided with the cells having honeycomb structure in the diluting compartments. The product water flown out of the preceding electrodeionization apparatus is of the following quality:

pH: 9.5
conductivity: 13 μS/cm
concentration of silica: 18 ppb
concentration of boron: 2.5 ppb For comparison, the succeeding electrodeionization apparatus is substituted for the conventional electrodeionization apparatus provided with ribs in the diluting compartments.

Operational conditions and results are shown in Table 3.

The measuring conditions are as follows
[measuring condition]
The cells of the electrodeionization apparatus: Hexagonal form, the area of which is 3.9 cm².

Spacing between ribs: 28 mm
Ion exchange resin of the diluting compartments: SA 10A of anion resin and SK 1B of cation resin; both of which are produced by Mitsubishi Chemical Corporation; (including 6 parts of the anion exchange resin and 4 parts of the cation exchange resin)
Ion exchange membrane: AHA (anion exchange membrane), CMB (cation exchange membrane) produced by Tokuyama Co., Ltd.
The operating conditions are shown in Table 3.

TABLE 3

|  | Example 7 | (For comparison) |
|---|---|---|
| number of cells | 4 | 12 |
| thickness of diluting compartment (mm) | 5.0 | 2.5 |
| height of cell (cm) | 400 | 600 |
| Space velocity ($hr^{-1}$) | 120 | 60 |
| voltage applied (V) | 25 | 54 |
| current flown (A) | 2.5 | 1.0 |
| resistivity of product water (MΩ.cm) | 18.2 | 18.2 |
| $SiO_2$ concentration in product water flown out of succeeding electrodeionization apparatus (ppb as $SiO_2$) | <0.1 | <0.1 |
| B concentration in product water flown out of succeeding electrodeionization apparatus (ppb as B) | <0.05 | <0.05 |

As clearly shown by Table 3, the apparatus of the present invention provides the product water of high quality at a higher rate than the comparison one. It is also shown that apparatus of the present invention has the small height and is very compact.

Example 8, Comparative Example 4

In Example 8 and Comparative Example 4, the apparatus for producing purified water in which the following activated carbon apparatus, RO membrane apparatus, and two electrodeionization apparatus are connected in series are used.

Activated carbon apparatus: "Kuricoal KW10-30" produced by Kurita Water Industries Ltd.
RO membrane apparatus: "Maku-Ace KN200" produced by Kurita Water Industries Ltd.
Electrodeionization apparatus: "Pure-Ace PA-200" produced by Kurita Water Industries Ltd.
flow rate of product: 100 liters per hour The electrodeionization apparatuses are assembled as shown FIG. 1 wherein the following ion exchange membranes are employed in the aforementioned electrodeionization apparatus, the diluting compartments are filled with the mixture of the ion exchange resins composed of 6 parts by volume of the following anion exchange resin and 4 parts by volume of the following cation exchange resin. The anion exchange resin and cation exchange resin are sufficiently washed by the ultra-pure water before they are filled into the diluting compartments.

Two types of electrodeionization apparatuses one of which is an electrodeionization apparatus "B" provided with the diluting compartments having a thickness W of 2.5 mm and consisting of 12 cells, and the other of which is an electrodeionization apparatus "A" provided with the diluting compartments having a thickness W of 10 mm and consisting of 3 cells are assembled.

Anion exchange membrane: "Neosepta AHA" produced by Tokuyama Co., Ltd.
Cation exchange membrane: "Neosepta CMB" produced by Tokuyama Co., Ltd.

Anion exchange resin: "SA 10A" produced by Mitsubishi Chemical Corporation.

Cation electrodeionization apparatus: "SK 1B" produced by Mitsubishi Chemical Corporation.

The RO apparatus employs the RO membrane shown in Table 4 and the electrodeionization apparatus composed of the electrodeionization apparatus "A" and electrodeionization apparatus "B" which are connected together in series. The treatment is conducted under conditions where the flow rate of product is 100 liters per hour, the water flows in the electrodeionization apparatus at SV of 70 per hour, the recovery of the water in the RO apparatus is 75%, and the recovery of water in the electrodeionization apparatus 80%. The measurement of the water quality in the RO apparatus, and the voltage, the current and the water quality in the electrodeionization apparatus are shown in Table 4.

TABLE 4

|  | Example 8 | Comparative Example 4 |
|---|---|---|
| RO membrane apparatus |  |  |
| Type of RO membrane | Hydrophilic "SUL-G10" produced by Toray Co., Ltd. * | "NTR 759" produced by Nitto Electrical Industry. |
| performance of RO membrane |  |  |
| Na$^+$ removal rate [%] | 93.0 | 99.5 |
| Cl$^-$ removal rate [%] | 97.5 | 99.5 |
| Ca$^{2+}$ removal rate [%] | 99.6 | 99.8 |
| silica removal rate [%] | 99.5 | 99.5 |
| pH of feed water | 6.5 | 6.5 |
| conductivity of feed water [$\mu$S/cm] | 160 | 160 |
| conductivity of permeating water [$\mu$S/cm] | 25 | 2.1 |
| electrodeionization apparatus A |  |  |
| electric current [A] | 1.5 | 0.06 |
| electric voltage [V] | 30 | 85 |
| conductivity of product water [$\mu$S/cm] | 30 | 0.1 |
| pH | 9.8 | 7.4 |
| silica removal rate [%] | >98 | 53 |
| electrodeionization apparatus B |  |  |
| electric current [A] | 1.0 | 0.05 |
| electric voltage [V] | 30 | 80 |
| silica removal rate [%] | >98 | 50 |
| resistivity of product water [M$\Omega$·cm] | 18.2 | 15 |

*: This membrane is prepared in such a manner that the "SUL-G10" membrane is immersed in a solution consisting of purified water and sodium hypochlorite of 1000 ppm (expressed as Cl$_2$), and the solution is circulated for 24 hours so as to be hydrophilic.

According to Table 4, in Comparative Example 4 wherein the RO membrane having high degree of diluting is employed, the current hardly flows and the quality of the product water is scarcely improved in the electrodeionization apparatus. In contrast, in Example 8, the apparatus employing the RO membrane having the degree of diluting of equal to or less than 97%, preferably further having the removal rate of the hardness and the silica of equal to or more than 97%, and employing the diluting compartments having a thickness, of equal to or more than 7 mm achieves high quality of the product water by large current and diluting efficiency.

Example 9

The electrodeionization apparatus of Example 1 shown in Table 1, and ultraviolet-light irradiating apparatus provided with two UV lumps ("AZ-26 (0.1 kW)" produced by Japan Photo Science Co,. Ltd.), and the succeeding electrodeionization apparatus 3B shown in Table 2 are arranged in this order and connected in series. Raw water having TOC of 300 ppb is fed into the apparatuses. The product water flowing out of the preceding electrodeionization apparatus has pH of 9.5.

The measurements of TOC concentration of the product water flowing out of each electrodeionization apparatus are shown in Table 5.

TABLE 5

|  | Example 9 | Example 10 | Comparative Example 5 |
|---|---|---|---|
| TOC of product water of preceding electrodeionization apparatus [ppb] | 55 | 55 | 70 |
| TOC of product water of succeeding electrodeionization apparatus [ppb] | 2.5 | 1.1 | 10 |

TOC of raw water: 300 ppb

Example 10

In Example 9, HO$_2$ is added to the product water flowing out from the preceding electrodeionization apparatus to set the concentration in the water for 1 ppm. The measurements of TOC are shown in Table 5.

Comparative Example 5

Treatment is made in the same manner as Example 9 except that the electrodeionization apparatus of Comparative Example 1 shown in Table 1 is employed for preceding electrodeionization apparatus and NaCl added to the product water flowing out from the preceding electrodeionization apparatus to measure the TOC. The measurements of TOC are also shown in Table 4.

In this treatment, NaCl is added in order to increase the conductivity to about 15 $\mu$S/cm. In Examples 9 and 10, the conductivity of the feed water flowing out from the preceding electrodeionization apparatus is about 15 $\mu$S/cm.

As shown Table 5, according to the present invention, the concentration of TOC is sufficiently lowered.

Example 11

The apparatus of Example 6 is inspected about influence by silica, and a method of recovery thereof is searched.

Step 1

When raw water having concentration of silica of 10,000 ppb is continuously fed into the apparatus of Example 6 for 24 hours, the concentration of silica of the product water flowing out from the preceding electrodeionization apparatus becomes 150 ppb, and that of the product water flowing out from the succeeding electrodeionization apparatus becomes 15 ppb.

Step 2

Then, feed water is changed to contain silica at a concentration of 200 ppb, and NaCl is added to the feed water to be fed into the preceding electrodeionization apparatus for 24 hours so as to set the conductivity of the feed water for 25 to 30 $\mu$S, pH of the water flowing out from the preceding electrodeionization apparatus for 10 to 10.2, the electrical voltage applied to the preceding electrodeionization apparatus for 35.2V, the current applied to the preceding electrodeionization apparatus for 2A, the electrical voltage applied to the succeeding electrodeionization apparatus for 41V, and the current applied to the succeeding electrodeionization apparatus for 1A. Three days after, the concentration of silica of the product water flowing out from the preceding electrodeionization apparatus becomes 25 ppb, and that of the product water flowing out from the succeeding electrodeionization apparatus becomes 0.2 ppb.

Comparative Example 6

The same experiment as Example 11 is conducted except that in the above step 2, NaCl is not added. As the result thereof, the silica concentration of the product water flowing out from the succeeding electrodeionization apparatus becomes 2.5 ppb which is extremely higher than in Example 6.

Table 6 shows the results of Example 11 and Comparative Example 6.

TABLE 6

|  | at a normal state | under fouled conditon (24 hours) | normal state (3 days after) | | |
|---|---|---|---|---|---|
|  |  |  | Comparative Example 6 | Example 11 | Example 12 |
| Concentration of silica in feed water | 200 | 10,000 | 200 | 200 | 200 |
| Concentration of silica in product water flown out of the preceding electrodeionization apparatus [ppb] | 18 | 150 | 50 | 25 | 15 |
| Concentration of silica in product water flown out of the succeecing electrodeionization apparatus [ppb] | <0.1 | 15 | 2.5 | 0.2 | <0.1 |

Example 12

In Example 11, the feed water fed into the preceding electrodeionization apparatus is heated to 40° C. besides addition of salt to the feed water. As the result, the silica concentration of the product water flowing out from the preceding electrodeionization apparatus is lowered to 15 ppb and that of the product water flowing out from the succeeding electrodeionization apparatus is lowered to less than 0.1 ppb.

INDUSTRIAL CAPABILITY OF THE INVENTION

As described above, according to the diluting compartments of the present invention, the weakly-ionized species having high disoccation constant such as silica and boron are efficiently removed without need of adding alkaline agent and without formation scale.

According to the apparatus for producing purified water of the present invention, by employing the multi-staged electrodeionization apparatuses the first of which relates to the present invention, the pure water of high purity is easily and efficiently produced, and the apparatus for producing purified water is provided at low cost.

What is claimed is:

1. An electrodeionization apparatus comprising:
   a cathode;
   an anode;
   concentrating compartments and diluting compartments alternately formed by arranging a plurality of cation exchange membranes and anion exchange membranes between the cathode and the anode; and,
   ion exchangers filled in the diluting compartments, said ion exchanger being a mixture of an anion exchanger and a cation exchanger or the anion exchanger alone,
   wherein a thickness of the diluting compartments is at least 7 mm so that product water having pH higher than pH of feed water by 1.0 or more is obtained when the feed water having pH of equal to or less than 8.5 is treated without adding an alkaline agent.

2. An electrodeionization apparatus claimed in claim 1, further comprising control means for controlling at least one of operational electric voltage and current, and space velocity of flow, said operational voltage being 1 to 50V per cell, and the space velocity being 30 to 150 per hour.

3. An electrodeionization apparatus as claimed in claim 1, wherein hardness in the feed water can be removed by more than 50%.

4. An electrodeionization apparatus as claimed in claim 1, wherein the feed water includes silica and/or boron.

5. An electrodeionization apparatus as claimed in claim 1, wherein a rate of electric resistance of the anion exchange membrane and the electric resistance of the cation exchange membrane is equal to or less than 0.8.

6. An electrodeionization apparatus claimed in claim 1, wherein a whole space between the cathode and the cation exchange membrane of the diluting compartment that is nearest to the cathode is designed for a cathodic compartment,
   wherein the cation exchange membrane is arranged between the anode and the anion exchange membrane of the diluting compartment that is nearest to the anode,
   wherein the concentrating compartment is designed between said cation exchange membrane and said diluting compartment that is nearest to the anode, and
   wherein the anodic compartment is designed between said cation exchange membrane and the anode.

7. An electrodeionization apparatus claimed in claim 1, wherein a foremost electrodeionization apparatus is provided with the anion exchange membrane having a homogeneous thickness and the cation exchange membrane having a heterogeneous thickness.

8. An apparatus for producing purified water consisting of at least two electrodeionization apparatuses connected so that water to be treated flows down therethrough,
   wherein a foremost electrodeionization apparatus is an electrodeionization apparatus claimed in claim 1.

9. An apparatus for producing pure water claimed in claim 8, wherein a diluting compartment of the second or later electrodeionization apparatus is thinner than the diluting compartments of the foremost electrodeionization apparatus.

10. An electrodeionization apparatus as claimed in claim 8, wherein said diluting compartment is divided into cells by a partition member,
    wherein at least a part of the partition member facing the cell is inclined relative to a vertical flow direction of water in the diluting compartment, and
    wherein at least the inclined part of the partition member allows the water to pass, but prevents the ion exchanger to pass therethrough.

11. An apparatus for producing purified water claimed in claim 8, wherein a pipe connecting the foremost electrodeionization apparatus and a second electrodeionization apparatus is provided with a pH meter, wherein an operation of the foremost electrodeionization apparatus is controlled so that a measurement of pH measured by said pH meter is equal to or more than 8.5.

12. An apparatus for producing purified water claimed in claim 8, wherein a pipe for discharging product water from a succeeding electrodeionization apparatus is provided with a meter for measuring resistivity and/or concentration of silica, and the electrodeionization apparatuses are controlled based on measurements of the meter.

13. An apparatus for producing purified water claimed in claim 8, wherein a water recovery of a succeeding electrodeionization apparatus is equal to or more than 95%.

14. An apparatus for producing purified water claimed in claim 8, wherein an ultraviolet-light irradiating apparatus is installed between the electrodeionization apparatuses.

15. An apparatus for producing purified water claimed in claim 8, wherein a first reverse osmosis membrane apparatus is provided before the foremost electrodeionization apparatus and a second reverse osmosis membrane apparatus is provided between the electrodeionization apparatuses.

16. An apparatus for producing purified water claimed in claim 8, wherein a reverse osmosis membrane apparatus is provided before the foremost electrodeionization apparatus and product water of the reverse osmosis membrane apparatus is fed into and flows down through the electrodeionization apparatuses, and wherein concentrated water of at least one of the preceding and succeeding electrodeionization apparatuses is fed back ahead of the reverse osmosis membrane apparatus.

17. An apparatus for producing purified water claimed in claim 8, wherein a reverse osmosis membrane apparatus is provided before the foremost electrodeionization apparatus, and product water of the reverse osmosis membrane apparatus is fed into the electrodeionization apparatuses, and wherein concentrated water of a second or later electrodeionization apparatus is fed back to a feeding pipe of the foremost, or later electrodeionization apparatus.

18. An electrodeionization apparatus in which a plurality of the cation exchange membrane and anion exchange membrane are arranged between a cathode and an anode to alternately form concentrating compartments and diluting compartments, and said diluting compartment is filled with an ion exchanger, wherein said electrodeionization apparatus has the diluting compartments having a thickness of equal to or more than 7 mm and the concentrating compartments having thickness of less than 7 mm, and feed water orderly flows through each diluting compartment in series so that product water having pH higher than pH of feed water by 1.0 or more is obtained when the feed water having pH of equal to or less than 8.5 is treated without adding an alkaline agent.

19. A method of controlling an electrodeionization apparatus comprising:

preparing concentrating compartments and diluting compartments alternately by arranging a plurality of cation exchange membranes and anion exchange membranes between a cathode and an anode so that a thickness of the diluting compartment is at least 7 mm, and filling ion exchangers in the diluting compartments, said ion exchanger being a mixture of an anion exchanger and a cation exchanger or the anion exchanger alone, and controlling at least one of operational electric voltage and current applied to the anode and cathode, and space velocity of flow, said operational voltage being 1 to 50V per cell, and the space velocity being 30 to 150 per hour so that product water having pH higher than pH of feed water by 1.0 or more is obtained when the feed water having pH of equal to or less than 8.5 is treated without adding an alkaline agent.

* * * * *